United States Patent
Shiba et al.

(10) Patent No.: US 11,648,462 B2
(45) Date of Patent: May 16, 2023

(54) NON-TRANSITORY COMPUTER-READABLE MEDIUM AND VIDEO GAME PROCESSING SYSTEM

(71) Applicant: SQUARE ENIX CO., LTD., Tokyo (JP)

(72) Inventors: Takamasa Shiba, Tokyo (JP); Hiroshi Kobayashi, Tokyo (JP); Jun Waga, Tokyo (JP); Yutaka Yoshida, Tokyo (JP)

(73) Assignee: SQUARE ENIX CO., LTD., Tokyo (JP)

( * ) Notice: Subject to any disclaimer, the term of this patent is extended or adjusted under 35 U.S.C. 154(b) by 0 days.

(21) Appl. No.: 17/446,645

(22) Filed: Sep. 1, 2021

(65) Prior Publication Data

US 2022/0062754 A1 Mar. 3, 2022

(30) Foreign Application Priority Data

Sep. 2, 2020 (JP) .............................. JP2020-147416

(51) Int. Cl.
*A63F 13/216* (2014.01)
*A63F 13/55* (2014.01)
*A63F 13/65* (2014.01)

(52) U.S. Cl.
CPC ............ *A63F 13/216* (2014.09); *A63F 13/55* (2014.09); *A63F 13/65* (2014.09)

(58) Field of Classification Search
CPC ........ A63F 13/216; A63F 13/55; A63F 13/65; A63F 13/355
See application file for complete search history.

(56) References Cited

U.S. PATENT DOCUMENTS 6,691,032 B1 * 2/2004 Irish ................... H04N 21/8541
701/487
8,761,800 B2 * 6/2014 Kuwahara ............... A63F 13/35
463/9

(Continued)

FOREIGN PATENT DOCUMENTS

JP 2002159742 A 6/2002
JP 6075489 B1 1/2017

(Continued)

OTHER PUBLICATIONS

Notification of Reasons for Refusal dated Oct. 5, 2021 for Japanese Application No. 2020-147416 with English Translation; pp. all.

(Continued)

*Primary Examiner* — Seng H Lim
(74) *Attorney, Agent, or Firm* — Dorsey & Whitney LLP

(57) ABSTRACT

A non-transitory computer-readable medium including a video game processing program for causing a server to perform functions to control progress of a video game is provided. The functions include: a first specifying function configured to specify at least a part of a virtual space as a first target virtual space; a registering function configured to register the object and the user in a storage unit so as to be associated with each other; a second specifying function configured to specify a second target virtual space as the virtual space in a case where the object associated with the user is selected; and a generating function configured to generate an event corresponding to the object in a case where the object positioned within an area of the first or second target virtual space respectively specified by the first or second specifying function is selected by the user.

9 Claims, 12 Drawing Sheets

(56) References Cited

U.S. PATENT DOCUMENTS

| | | | |
|---|---|---|---|
| 9,539,498 B1* | 1/2017 | Hanke | A63F 13/00 |
| 9,669,296 B1* | 6/2017 | Hibbert | A63F 13/5378 |
| 9,782,668 B1* | 10/2017 | Golden | A63F 13/00 |
| 2011/0320019 A1* | 12/2011 | Lanciani | G06F 16/22 |
| | | | 700/92 |
| 2012/0315992 A1* | 12/2012 | Gerson | A63F 13/216 |
| | | | 463/42 |
| 2013/0288787 A1* | 10/2013 | Yoshie | A63F 13/95 |
| | | | 463/30 |
| 2013/0310079 A1* | 11/2013 | Kuwahara | A63F 13/35 |
| | | | 455/456.3 |
| 2014/0031128 A1* | 1/2014 | Piccionielli | G07F 17/3223 |
| | | | 463/42 |
| 2014/0357339 A1* | 12/2014 | Urushihara | G07F 17/329 |
| | | | 463/17 |
| 2017/0352226 A1* | 12/2017 | Matsuzawa | A63F 13/67 |
| 2018/0165701 A1* | 6/2018 | Onda | A63F 13/69 |
| 2018/0236357 A1* | 8/2018 | Taura | A63F 13/5372 |
| 2018/0345147 A1* | 12/2018 | Okajima | A63F 13/332 |
| 2019/0134508 A1* | 5/2019 | Matsuzawa | A63F 13/213 |
| 2020/0393953 A1* | 12/2020 | Zhang | G06F 3/04842 |
| 2021/0090400 A1* | 3/2021 | Hayashi | G07F 17/3267 |
| 2021/0252384 A1* | 8/2021 | Li | A63F 13/35 |
| 2021/0375052 A1* | 12/2021 | Abiko | A63F 13/65 |

FOREIGN PATENT DOCUMENTS

| | | |
|---|---|---|
| JP | 2017113174 A | 6/2017 |
| JP | 6404490 B2 | 9/2018 |
| JP | 2019177082 A | 10/2019 |
| JP | 2020074822 A | 5/2020 |
| JP | 6763495 B1 | 9/2020 |

OTHER PUBLICATIONS

[English Translation] The Notice of Reasons for Refusal dated May 17, 2022 for Japanese Patent Application No. 2020-147416.

* cited by examiner

REGISTERED OBJECT RELATED INFORMATION

| User name | Tough enemy frame 1 | Tough enemy frame 2 | ... | Dungeon frame 1 | Dungeon frame 2 | ... |
|---|---|---|---|---|---|---|
| x x x | Character A | Character B | ... | Dungeon 1 | | ... |

NON-TRANSITORY COMPUTER-READABLE MEDIUM AND VIDEO GAME PROCESSING SYSTEM

CROSS-REFERENCE TO RELATED APPLICATION

The present application claims priority to and the benefit of Japanese Patent Application No. 2020-147416 filed on Sep. 2, 2020, the disclosure of which is expressly incorporated herein by reference in its entirety for any purpose.

BACKGROUND

At least one of embodiments of the present disclosure relates to a non-transitory computer-readable medium including a video game processing program and a video game processing system for causing a server to perform functions to control progress of a video game using a virtual space corresponding to map information of a real space and positional information of a user terminal of a user.

Conventionally, various systems each using positional information of a user terminal have been proposed in a field of video games.

In such a system, there is one in which a user terminal is caused to display map information of a real space containing positional information of the user terminal, and a predetermined game event is generated in a case where the user terminal exists in a predetermined place in the real space. Examples of such system may be found in Japanese Patent Application Publication No. 2002-159742. However, in the conventional system, users who cannot move in the real space may not be able to enjoy an event generated in a video game, and this may cause the user to lose interest in the video game.

SUMMARY

It is an object of at least one of embodiments of the present disclosure to solve the problem described above, and to prevent a user from losing interest in a video game.

According to one non-limiting aspect of the present disclosure, there is provided a non-transitory computer-readable medium including a video game processing program for causing a server to perform functions to control progress of a video game using a virtual space corresponding to map information of a real space and positional information of a user terminal of a user.

The functions include a first specifying function configured to specify at least a part of the virtual space as a first target virtual space on a basis of virtual space related information and a position of the user, an object that appears in the video game and positional information of the virtual space being associated with each other in the virtual space related information, the position of the user being specified from the positional information of the user terminal, the user terminal being caused to display the virtual space.

The functions also include a registering function configured to register the object and the user in a storage unit so as to be associated with each other on a basis of a position of the object and the position of the user.

The functions also include a second specifying function configured to specify a second target virtual space as the virtual space that the user terminal is caused to display in a case where the object associated with the user is selected by the user, the second target virtual space including the object or another object related to the object.

The functions also include a generating function configured to generate an event corresponding to an object in a case where the object that is positioned within an area of the first target virtual space or the second target virtual space respectively specified by the first specifying function or the second specifying function is selected by the user.

According to another non-limiting aspect of the present disclosure, there is provided a video game processing system for controlling progress of a video game using a virtual space corresponding to map information of a real space and positional information of a user terminal of a user. The video game processing system includes a communication network, a server, and the user terminal.

The video game processing system includes a first specifier configured to specify at least a part of the virtual space as a first target virtual space on a basis of virtual space related information and a position of the user, an object that appears in the video game and positional information of the virtual space being associated with each other in the virtual space related information, the position of the user being specified from the positional information of the user terminal, the user terminal being caused to display the virtual space.

The video game processing system also includes a registerer configured to register the object and the user in a storage unit so as to be associated with each other on a basis of a position of the object and the position of the user.

The video game processing system also includes a second specifier configured to specify a second target virtual space as the virtual space that the user terminal is caused to display in a case where the object associated with the user is selected by the user, the second target virtual space including the object or another object related to the object.

The video game processing system also includes a generator configured to generate an event corresponding to an object in a case where the object that is positioned within an area of the first target virtual space or the second target virtual space respectively specified by the first specifier or the second specifier is selected by the user.

According to still another non-limiting aspect of the present disclosure, there is provided a non-transitory computer-readable medium including a video game processing program for causing a user terminal to perform functions to control progress of a video game using a virtual space corresponding to map information of a real space and positional information of the user terminal of a user.

The functions include a first specifying function configured to specify at least a part of the virtual space as a first target virtual space on a basis of virtual space related information and a position of the user, an object that appears in the video game and positional information of the virtual space being associated with each other in the virtual space related information, the position of the user being specified from the positional information of the user terminal, the user terminal being caused to display the virtual space.

The functions also include a registering function configured to register the object and the user in a storage unit so as to be associated with each other on a basis of a position of the object and the position of the user.

The functions also include a second specifying function configured to specify a second target virtual space as the virtual space that the user terminal is caused to display in a case where the object associated with the user is selected by the user, the second target virtual space including the object or another object related to the object.

The functions also include a generating function configured to generate an event corresponding to an object in a case where the object that is positioned within an area of the first target virtual space or the second target virtual space respectively specified by the first specifying function or the second specifying function is selected by the user.

According to each of the embodiments of the present application, one or two or more shortages are solved.

BRIEF DESCRIPTION OF DRAWINGS

The foregoing and other objects, features and advantages of the present disclosure will become more readily apparent from the following detailed description of preferred embodiments of the present disclosure that proceeds with reference to the appending drawings.

DETAILED DESCRIPTION

Hereinafter, examples of embodiments according to the present disclosure will be described with reference to the drawings. Note that various components in the respective embodiments described below can be appropriately combined without any contradiction or the like. In addition, the description of the content described as a certain embodiment may be omitted in another embodiment. Further, the content of an operation or processing that does not relate to features of each of the embodiments may be omitted. Moreover, the order of various processes that constitute various flows described below may be changed without any contradiction or the like of processing content.

First Embodiment

Figure 1:
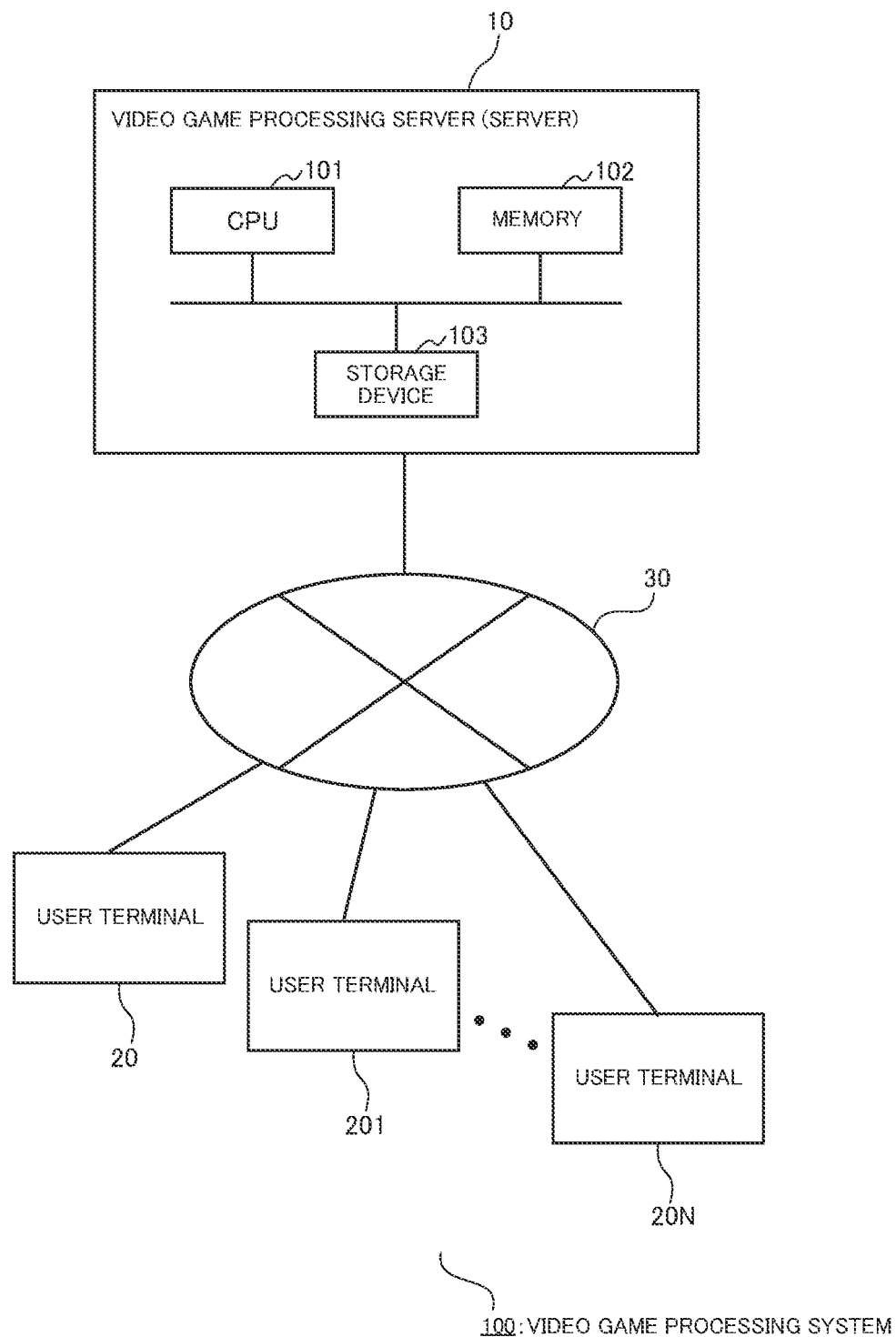
FIG. 1 is a block diagram illustrating an example of a configuration of a video game processing system corresponding to at least one of the embodiments of the present disclosure.

FIG. 1 is a block diagram illustrating an example of a configuration of a video game processing system 100 according to one embodiment of the present disclosure. As illustrated in FIG. 1, the video game processing system 100 includes a video game processing server 10 (hereinafter, referred to as a "server 10") and user terminals 20, and 201 to 20N ("N" is an arbitrary integer) respectively used by users of the video game processing system 100. In this regard, the configuration of the video game processing system 100 is not limited to this configuration. The video game processing system 100 may be configured so that the plurality of users uses a single user terminal, or may be configured so as to include a plurality of servers.

Each of the server 10 and the plurality of user terminals 20 and 201 to 20N is connected to a communication network 30 such as the Internet. In this regard, although it is not illustrated in the drawings, the plurality of user terminals 20 and 201 to 20N is connected to the communication network 30 by executing data communication with base stations managed by a telecommunication carrier by means of a radio communication line.

The video game processing system 100 includes the server 10 and the plurality of user terminals 20 and 201 to 20N, whereby various kinds of functions for executing various kinds of processing in response to an operation of the user are performed.

The server 10 is managed by an administrator of the video game processing system 100, and has various kinds of functions to provide information regarding various kinds of processing to the plurality of user terminals 20 and 201 to 20N. In the present embodiment, the server 10 is constructed by an information processing apparatus, such as a WWW server, and includes a storage medium for storing various kinds of information. A configuration of the server 10 is not limited particularly so long as the server 10 includes a general configuration for executing various kinds of processes as a computer, such as a control unit and a communication unit. Hereinafter, an example of a hardware configuration of the server 10 will be described briefly.

As illustrated in FIG. 1, the server 10 at least includes a CPU (Central Processing Unit) 101, a memory 102, and a storage device 103.

The CPU 101 is a central processing unit configured to execute various kinds of calculations and controls. Further, in a case where the server 10 includes a GPU (Graphics Processing Unit), a part of the various kinds of calculations and controls may be executed by the GPU. The server 10 appropriately executes, by the CPU 101, various kinds of information processing required to control a video game by using data read out onto the memory 102, and stores obtained processing results in the storage device 103 as needed.

The storage device 103 has a function as a storage medium for storing various kinds of information. A configuration of the storage device 103 is not limited particularly. However, it is preferable that the storage device 103 is configured so as to be capable of storing all of the various kinds of information required to control the video game from the viewpoint of reducing a processing load on each of the plurality of user terminals 20 and 201 to 20N. As such examples, there are an HDD and an SSD. However, a storage unit for storing the various kinds of information may be provided with a storage region in a state that the server 10 can access the storage region, for example, and may be configured so as to have a dedicated storage region outside the server 10.

Figure 2:
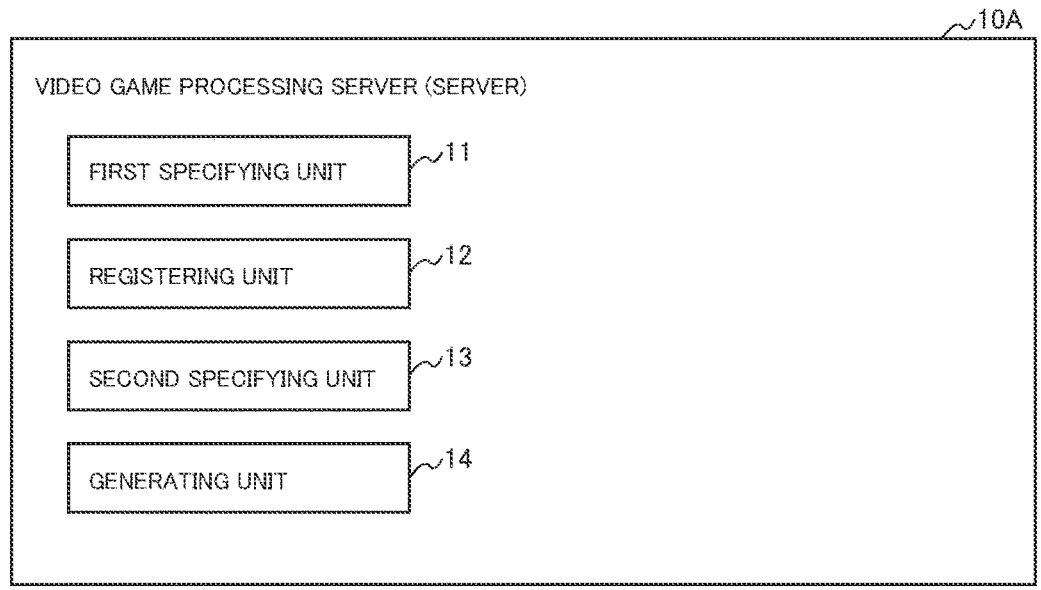
FIG. 2 is a block diagram illustrating a configuration of a server corresponding to at least one of the embodiments of the present disclosure.

FIG. 2 is a block diagram illustrating a configuration of a video game processing server 10A (hereinafter, referred to as a "server 10A"), which is an example of the configuration of the server 10 that performs functions to control progress of the video game using a virtual space corresponding to map information of a real space and positional information of a user terminal. As illustrated in FIG. 2, the server 10A at least includes a first specifying unit 11, a registering unit 12, a second specifying unit 13, and a generating unit 14.

Here, the virtual space corresponding to the map information of the real space means a virtual space that is generated by using the map information of the real space. A configuration to generate the virtual space is not limited particularly. However, it is preferable that the generating unit 12 is configured so that the user can recognize that the virtual space is generated on the basis of the map information of the real space. As an example of such a configuration, there is a configuration in which the virtual space is generated by respectively arranging objects corresponding to roads and buildings in the real space at positions corresponding to roads and buildings in the real space. In this regard, a configuration of the object corresponding to each of the roads and the buildings in the real space is not limited particularly. However, it is preferable that the object is configured so that the user can recognize that it has a correspondence relationship with a road, a building, or the like. As examples of such a configuration, there are an object created to resemble the appearance of a road and an object (for example, an enemy character) different from objects that constitute the virtual space (for example, the ground). Further, a configuration to associate the position in the real space with the position in the virtual space is not limited particularly. However, the generating unit 12 may be configured so that a coordinate in the real space and a coordinate in the virtual space are defined in a one-to-one relationship, or may be configured so that the coordinates are defined in a plural-to-one relationship or a one-to-plural relationship.

Further, the positional information of the user terminal 20 means information indicating a position of the user terminal 20 in the real space. A configuration of the positional information is not limited particularly. However, it is preferable that the positional information is configured so as to contain coordinates that can specify the position of the user terminal 20 in the real space. As examples of the configuration to obtain the positional information of the user terminal 20, there are a configuration to obtain the positional information by using a GPS signal, and a configuration to obtain the positional information on the basis of reception intensity information of wireless signals from a plurality of beacon transmitters.

Further, a configuration to control progress of the video game on the basis of positional information of the user terminal is not limited particularly. The server 10A may be configured so as to generate a predetermined event on the condition of an operational input by the user, or may be configured so as to generate an event specified by only the positional information.

The first specifying unit 11 has a function to specify at least a part of the virtual space as a virtual space (that is, a first target virtual space) or a display area, which the user terminal is caused to display, on the basis of virtual space related information and a position of the user. An object that appears in the video game and positional information of the virtual space are associated with each other in the virtual space related information. The position of the user is specified from the positional information of the user terminal.

Here, the object means one of various targets in the video game. A configuration of the object is not limited particularly so long as the user can recognize the object. As examples of the object, there are a character that becomes an operation target of the user, an enemy character, an item, a building, a dungeon, and a quest.

Further, the positional information of the virtual space means information for specifying a position in the virtual space. A configuration to associate the object with the positional information of the virtual space is not limited particularly. However, it is preferable that association of the object with the positional information of the virtual space can be changed by progress of the video game and an operation of a video game provider side.

Further, a configuration to specify the position of the user from the positional information of the user terminal is not limited particularly. However, it is preferable that the position of the user is specified in real time in accordance with movement of the user terminal.

Further, a configuration to specify a virtual space on the basis of virtual space related information and a user position is not limited particularly. However, it is preferable that the first specifying unit 11 is configured so that the user can recognize that the movement of the user terminal in the real space is reflected to the virtual space. As an example of such a configuration, there is a configuration in which an area with a predetermined form based on a position of a user is specified as the virtual space that the user terminal is caused to display.

Further, the phrase "specify at least a part of the virtual space as the virtual space that the user terminal is caused to display" means that a configuration of the virtual space that the user terminal is caused to display is defined. A configuration to define the virtual space is not limited particularly. However, it is preferable that the first specifying unit 11 is configured so that a communication volume between the server and the user terminal does not become excessive. As an example of such a configuration, there is a configuration in which arrangement of objects and a change in the arrangement over time are specified in a virtual space within a predetermined distance from a position of a user terminal.

The registering unit 12 has a function to register the object and the user in a storage unit (not illustrated in the drawings) so as to be associated with each other on the basis of a position of the object and the position of the user.

Here, a configuration to associate the object with the user is not limited particularly so long as it is a configuration based on each other's position. However, it is preferable that the registering unit 12 is configured so that a registration condition includes a fact that a distance between a user and an object is close to each other to an extent. As examples of such a configuration, there are a configuration in which among objects displayed on a game screen, an object specified by a user operation is associated with a user, and a configuration in which among objects positioned in a virtual space, an object that is positioned within a predetermined distance from a position of a user is associated with the user regardless of a user operation.

The second specifying unit 13 has a function to specify a virtual space including an object or another object related to the object (that is, a second target virtual space) as the virtual space that the user terminal is caused to display in a case where the object associated with the user is selected by the user.

Here, a configuration to cause the user to select the object associated with the user is not limited particularly. However, it is preferable that the second specifying unit 13 is configured so that an arbitrary object can be selected in a case where a plurality of objects is associated with each other. As an example of such a configuration, there is a configuration in which a list of objects associated with a user is displayed and a selection operation by the user against any object is received.

Further, a configuration of another object related to the object (that is, a related object) is not limited particularly so long as the user can recognize association with the object. As examples of such a configuration, there are a configuration in which appearance of an enemy character is simplified, and a configuration in which a part constituting a dungeon is represented.

The generating unit 14 has a function to generate an event corresponding to an object in a case where the object that is positioned within an area of the specified virtual space is selected by the user.

Here, a configuration to specify the virtual space is not limited particularly so long as it includes a configuration to specify the first target virtual space by the first specifying unit 11 and a configuration to specify the second target virtual space by the second specifying unit 13. Further, a configuration to cause the user to select any object is not limited particularly so long as the user can recognize a selection result.

Further, the event means any of various kinds of occurrences that can be generated in the video game. A configuration of the event is not limited particularly. However, it is preferable that the configuration is according to a kind of object. As examples of such a configuration, there are a battle against an enemy character and search of a dungeon.

Each of the plurality of user terminals 20, and 201 to 20N is managed by the user, and is configured by a communication terminal capable of playing a network delivery type game, such as a cellular telephone terminal, a PDA (Personal Digital Assistants), a portable game apparatus, or a so-called wearable device, for example. In this regard, the configuration of the user terminal that the video game processing system 100 can include is not limited to the example described above. Each of the user terminals 20, and 201 to 20N may be configured so that the user can recognize the video game. As the other examples of the user terminal, there are one obtained by combining various kinds of communication terminals, a personal computer, and a stationary game apparatus.

Further, each of the plurality of user terminals 20, and 201 to 20N is connected to the communication network 30, and includes hardware (for example, a display device for displaying a browser screen or a game screen based on a coordinate and the like) and software for executing various kinds of processes by communicating with the server 10A. In this regard, each of the plurality of user terminals 20, and 201 to 20N may be configured so as to be able to directly communicate with each other without the server 10A.

Next, an operation of the video game processing system 100 (hereinafter, referred to as the "system 100") according to the present embodiment will be described.

Figure 3:
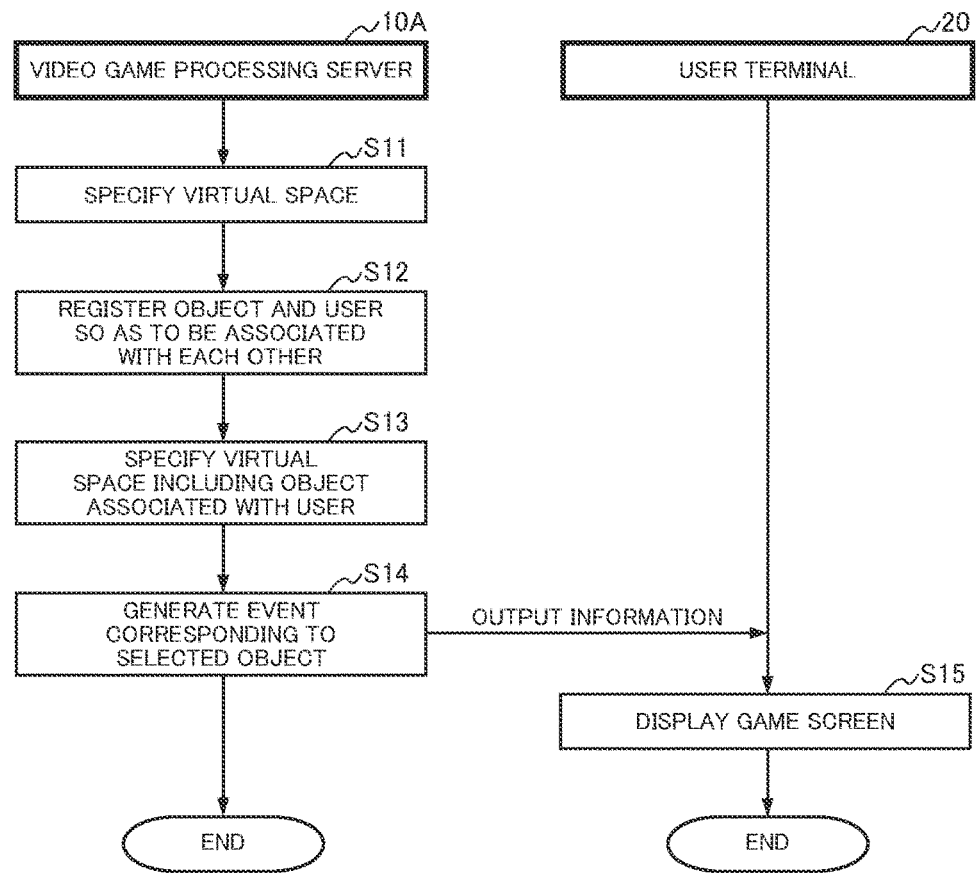
FIG. 3 is a flowchart illustrating an example of game processing corresponding to at least one of the embodiments of the present disclosure.

FIG. 3 is a flowchart illustrating an example of game processing executed by the system 100. In the game processing according to the present embodiment, processes related to a control of progress of the video game using the positional information of the user terminal 20 are executed. Hereinafter, a case where the server 10A and the user terminal 20 (hereinafter, referred to as the "terminal 20") execute the game processing will be described as an example.

The game processing is started as an opportunity that the terminal 20 accessing the server 10A requests display of a virtual space, for example.

In the game processing, the server 10A first specifies a virtual space (Step S11). In the present embodiment, the server 10A refers to a storage unit (not illustrated in the drawings), in which virtual space related information is stored, and specifies a predetermined area based on a position of a user specified from the positional information of the terminal 20 as a first target virtual space that the terminal 20 is caused to display on a display screen of a display device included in the terminal 20. Here, an object that appears in the video game and the positional information of the virtual space are associated with each other in the virtual space related information.

When the virtual space is specified, the server 10A registers the object and the user so as to be associated with each other (Step S12). In the present embodiment, in a case where a predetermined registration operation against the object positioned in the virtual space is received, the server 10A updates predetermined information to register the object and the user so as to be associated with each other.

When the object and the user are registered so as to be associated with each other, the server 10A specifies a virtual space including the object associated with the user (Step S13). In the present embodiment, the server 10A specifies a virtual space including the object by updating the predetermined information regarding the position of the user or a position of the object on the basis of a user operation.

When the virtual space including the object associated with the user is specified, the server 10A generates an event corresponding to the selected object (Step S14). In the present embodiment, in a case where identification information of the object selected by the user of the terminal 20 is received from the terminal 20 in which the specified virtual space is displayed, the server 10A transmits, to the terminal 20, output information for generating the event corresponding to the object.

When the output information is received from the server 10A, the terminal 20 outputs a game screen to the display screen of the display device (Step S15). In the present embodiment, the terminal 20 causes the display device to display a battle screen or a story screen on the display screen in accordance with a kind of object.

Figure 4:
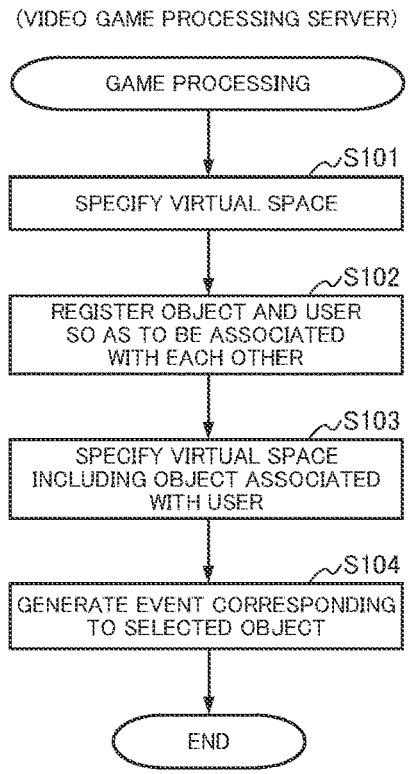
FIG. 4 is a flowchart illustrating an example of an operation of a server side in the game processing corresponding to at least one of the embodiments of the present disclosure.

FIG. 4 is a flowchart illustrating an example of an operation of the server 10A side in the game processing. Here, an operation of the server 10A in the system 100 will be described.

In the game processing, the server 10A first specifies a virtual space (Step S101); registers an object and a user so as to be associated with each other (Step S102); specifies a virtual space including the object associated with the user (Step S103); generates an event corresponding to the selected object (Step S104); and terminates the processes herein.

Figure 5:
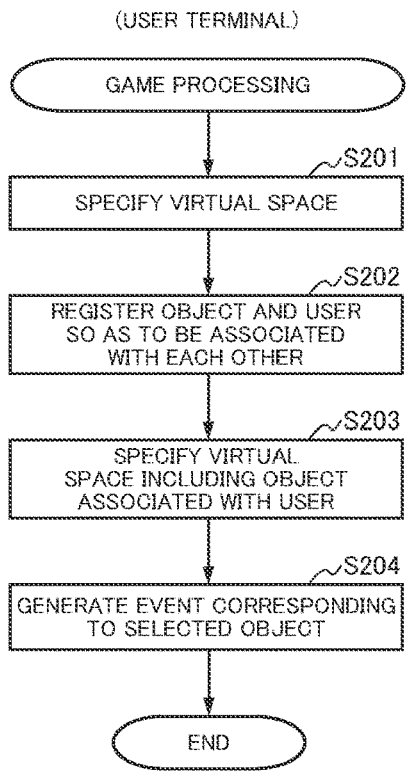
FIG. 5 is a flowchart illustrating an example of an operation of a terminal side in the game processing corresponding to at least one of the embodiments of the present disclosure.

FIG. 5 is a flowchart illustrating an example of the terminal 20 side in a case where the terminal 20 executes the game processing. Hereinafter, a case where the terminal 20 executes the game processing by a single body will be described as an example. In this regard, the configuration of the terminal 20 includes the similar functions to those of the server 10A except that the terminal 20 receives various kinds of information from the server 10A. For this reason, its explanation is omitted from a point of view to avoid repeated explanation.

In the game processing, the terminal 20 first specifies a virtual space (Step S201); registers an object and a user so as to be associated with each other (Step S202); specifies a virtual space including the object associated with the user (Step S203); generates an event corresponding to the selected object (Step S204); and terminates the processes herein.

As explained above, as one side of the first embodiment, the server 10A that controls progress of the video game using the virtual space corresponding to the map information of the real space and the positional information of the user terminal is configured so as to include the first specifying unit 11, the registering unit 12, the second specifying unit 13, and the generating unit 14. Thus, the first specifying unit 11 specifies at least a part of the virtual space as the first target virtual space, which the user terminal is caused to display, on the basis of virtual space related information and a position of the user, an object that appears in the video game and positional information of the virtual space being associated with each other in the virtual space related information, the position of the user being specified from the positional information of the user terminal; the registering unit 12 registers the object and the user in the storage unit so as to be associated with each other on the basis of the position of the object and the position of the user; the second specifying unit 13 specifies the second target virtual space including the object or another object related to the object as the virtual space that the user terminal is caused to display in a case where the object associated with the user is selected by the user; and the generating unit 14 generates the event corresponding to the object in a case where the object that is positioned within the area of the specified virtual space is selected by the user. Therefore, it is possible to prevent the user from losing interest in the video game.

Namely, the user can cause the terminal 20 to display an object by registering the object and then selecting the registered object. Therefore, the user can enjoy the video game even in a situation where the user cannot move in the real space.

Second Embodiment

Figure 6:
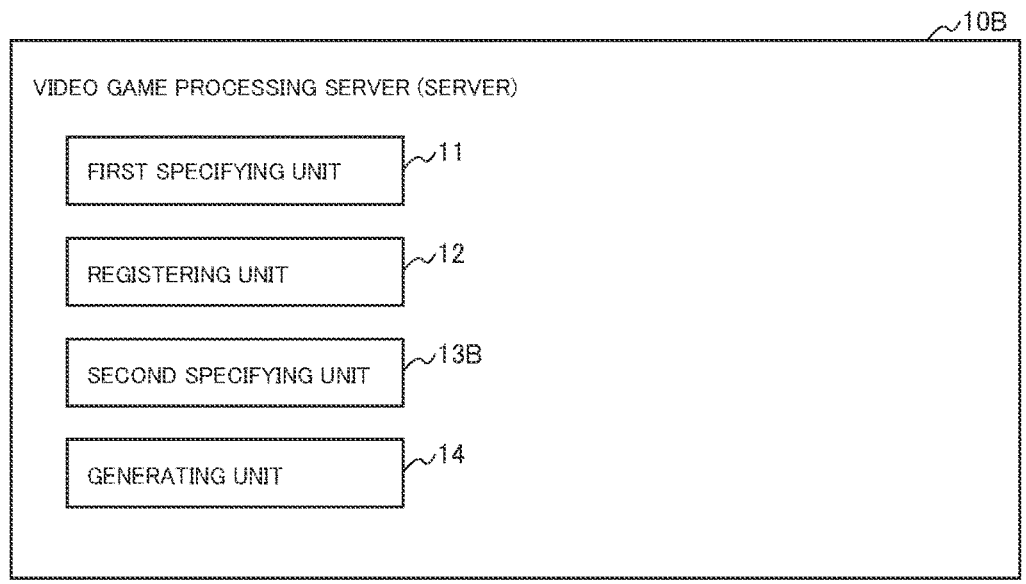
FIG. 6 is a block diagram illustrating a configuration of a server corresponding to at least one of the embodiments of the present disclosure.

FIG. 6 is a block diagram illustrating a configuration of a video game processing server 10B (hereinafter, referred to as a "server 10B"), which is an example of the video game processing server 10. In the present embodiment, the server 10B at least includes a first specifying unit 11, a registering unit 12, a second specifying unit 13B, and a generating unit 14.

The second specifying unit 13B has a function to specify a second target virtual space including an object selected by a user by changing a position of the object in a virtual space on the basis of a current position of the user.

Here, a configuration to change a position of the object selected by the user in a virtual space on the basis of a current position of the user is not limited particularly. However, it is preferable that the second specifying unit 13B is configured so that the user can recognize a position of the object after change. As an example of such a configuration, there is a configuration in which a position of an object is changed into a position that is within an area, which is displayed on a display screen of a user terminal 20, and does not overlap with another object. In this regard, at this time, the second specifying unit 13B may be configured so that positional information indicating a current position of the user terminal 20 in a real space is used as the current position of the user as a basis, or may be configured so that a current position of the user in the virtual space is used as the current position of the user as the basis.

Further, the phrase "specify a virtual space by changing a position of the object in a virtual space" means that information containing the position of the object after change is defined as information indicating a configuration of the virtual space that the user terminal is caused to display. A configuration to specify a virtual space by changing a position of the object is not limited particularly. However, it is preferable that the second specifying unit 13B is configured so that the user can recognize the change of the position of the object as a result of selection of the user. As an example of such a configuration, there is a configuration in which an object whose position is changed by an operation of the user is drawn in a game screen displayed on the display screen of the user terminal 20.

Figure 7:
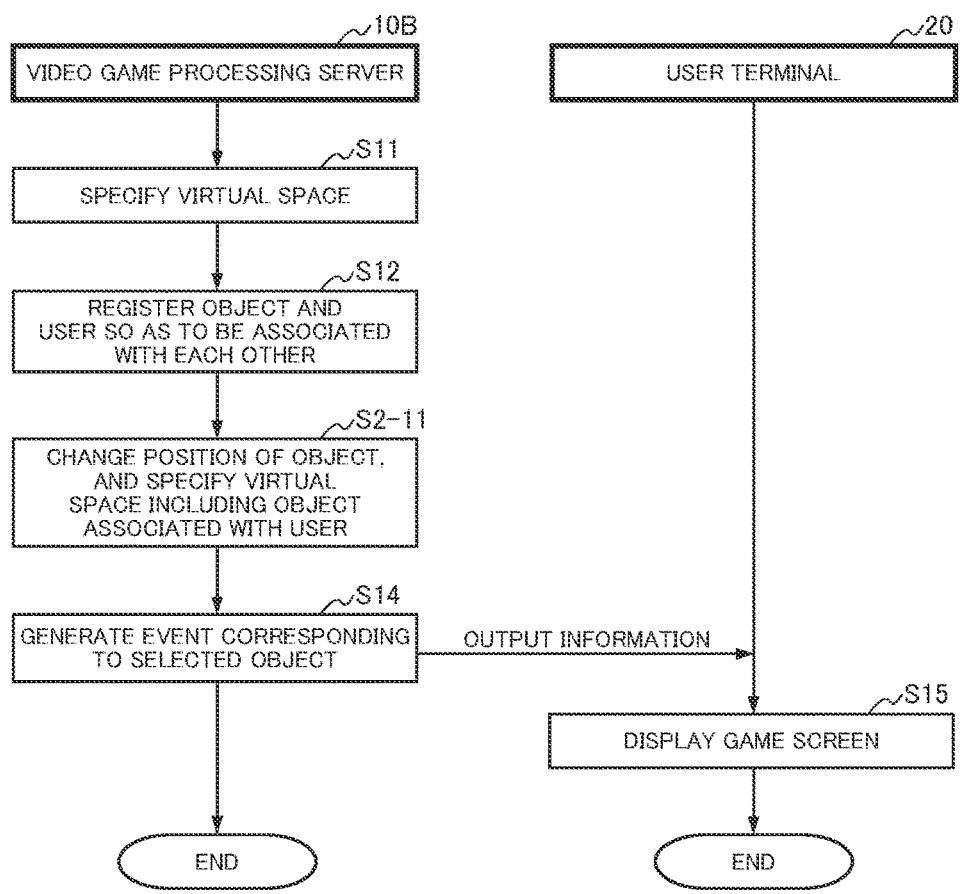
FIG. 7 is a flowchart illustrating an example of game processing corresponding to at least one of the embodiments of the present disclosure.

FIG. 7 is a flowchart illustrating an example of game processing executed by a video game processing system 100. Hereinafter, operations of the server 10B and the user terminal 20 (hereinafter, referred to as the "terminal 20") will be described as an example. In this regard, a flowchart illustrating an operation of each of the server 10B and the terminal 20 is omitted from a point of view to avoid repeated explanation.

After an object and a user are registered so as to be associated with each other, the server 10B changes a position of the object, and specifies a virtual space including the object associated with the user (Step S2-11). In the present embodiment, the server 10B changes the position of the registered object selected by the user into a position within a predetermined distance from a current position of user, thereby specifying a virtual space, in which the object is arranged, as virtual space that the terminal 20 is caused to display.

As explained above, as one side of the second embodiment, the server 10B that controls progress of a video game using the virtual space corresponding to the map information of the real space and the positional information of the user terminal is configured so as to include the first specifying unit 11, the registering unit 12, the second specifying unit 13B, and the generating unit 14. Thus, the second specifying unit 13B specifies the virtual space including the object by changing the position of the object selected by the user in the virtual space on the basis of the current position of the user, and specifies a virtual space so as to become a state where the object registered by the user is arranged near the user. Therefore, it is possible to encourage the user to play the video game even in a case where the user cannot move in the real space.

Third Embodiment

Figure 8:
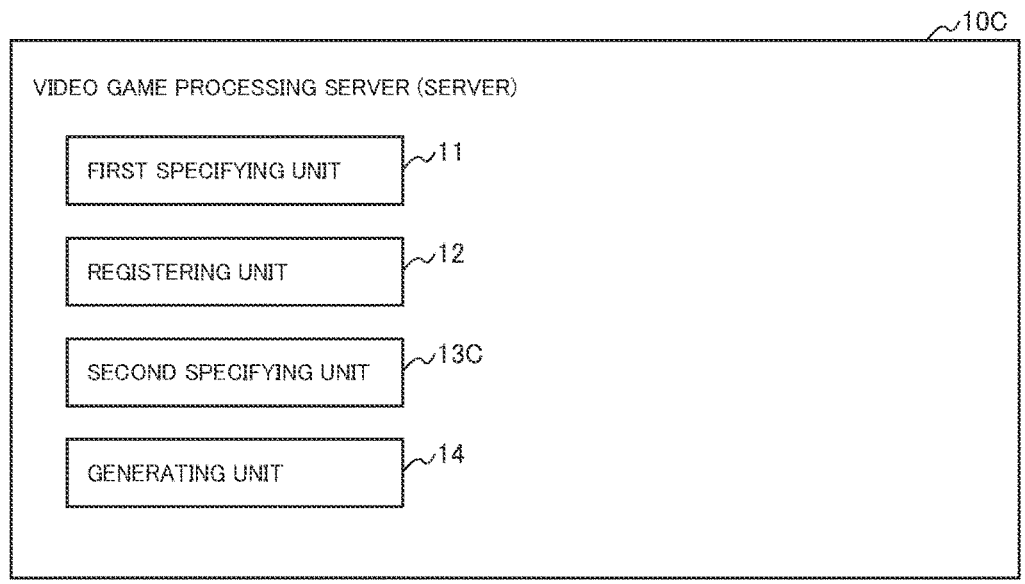
FIG. 8 is a block diagram illustrating a configuration of a server corresponding to at least one of the embodiments of the present disclosure.

FIG. 8 is a block diagram illustrating a configuration of a video game processing server 10C (hereinafter, referred to as a "server 10C"), which is an example of the video game processing server 10. In the present embodiment, the server 10C at least includes a first specifying unit 11, a registering unit 12, a second specifying unit 13C, and a generating unit 14.

The second specifying unit 13C has a function to specify, in a case where an object selected by a user includes at least one sub object, a virtual space including the sub object by determining arrangement of the sub object on the basis of a current position of the user.

Here, the sub object means an object that belongs to the selected object. A configuration of the sub object is not limited particularly. However, it is preferable that the second specifying unit 13C is configured so that the user can recognize a relationship with the object to which the user himself or herself belongs. As examples of such a configuration, there are each of enemy characters in which the object is a group of enemy characters, an item in a case where an object is a dungeon, and an appearing character.

Further, the phrase "specify a virtual space by determining arrangement of the sub object on the basis of a current position of the user" means that information containing arrangement of a sub object after determination is defined as information indicating a configuration of a virtual space that a user terminal is caused to display. A configuration to specify a virtual space by determining arrangement of the sub object is not limited particularly. However, it is preferable that the second specifying unit 13C is configured so that the user can recognize that arrangement of a sub object is determined as a result of selection of the user. As an example of such a configuration, there is a configuration in which a situation that a sub object belonging to an object selected by a user is arranged is drawn in a game screen displayed on a display screen of a user terminal 20. In this regard, the second specifying unit 13C may be configured so that the object is also arranged together with the sub object. In this case, for example, the second specifying unit 13C may be configured so that the object is arranged in the vicinity of a position of the user and the sub object is arranged in the vicinity of the position of the user or the object.

Figure 9:
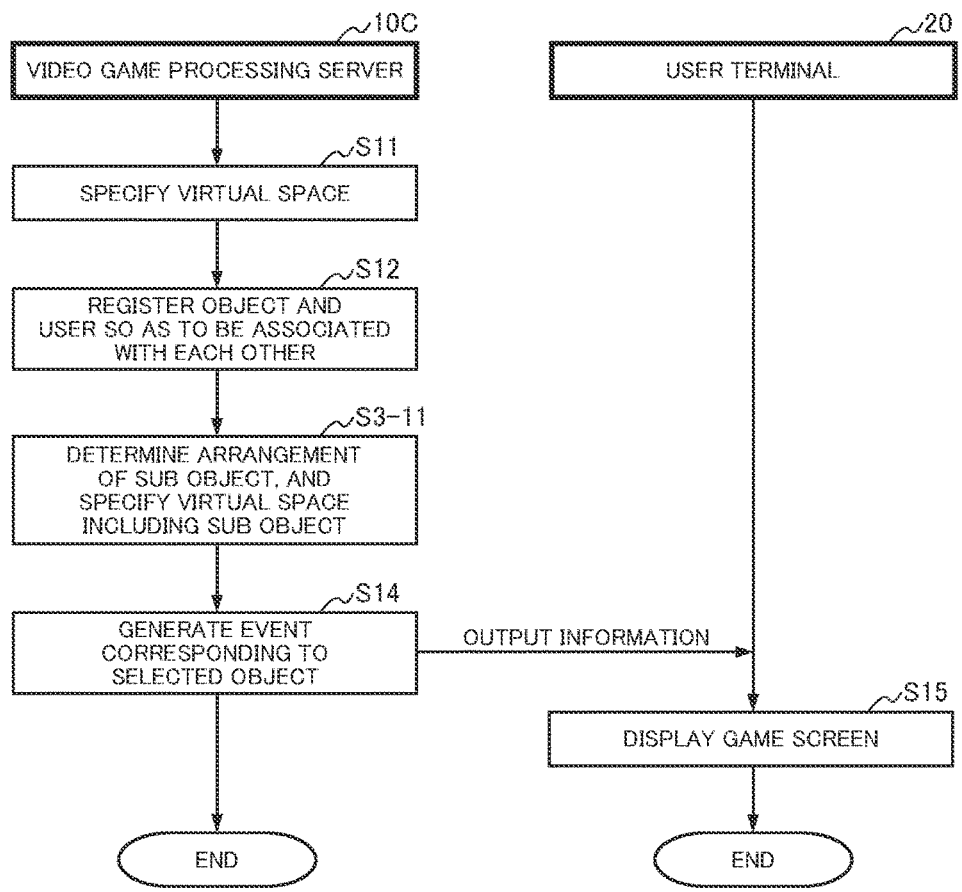
FIG. 9 is a flowchart illustrating an example of game processing corresponding to at least one of the embodiments of the present disclosure.

FIG. 9 is a flowchart illustrating an example of game processing executed by a video game processing system 100. Hereinafter, operations of the server 10C and the user terminal 20 (hereinafter, referred to as the "terminal 20") will be described as an example. In this regard, a flowchart illustrating an operation of each of the server 10C and the terminal 20 is omitted from a point of view to avoid repeated explanation.

After an object and a user are registered so as to be associated with each other, the server 10C determines arrangement of a sub object, and specifies a virtual space including the sub object (Step S3-11). In the present embodiment, the server 10C determines arrangement of a sub object that belongs to the object selected by the user on the basis of a current position of the user, thereby specifying a virtual space including the sub object as an object related to the object.

As explained above, as one side of the third embodiment, the server 10C that controls progress of a video game using the virtual space corresponding to the map information of a real space and the positional information of the user terminal is configured so as to include the first specifying unit 11, the registering unit 12, the second specifying unit 13C, and the generating unit 14. Thus, the second specifying unit 13C specifies, in a case where the object selected by the user includes at least one sub object, the virtual space including the sub object by determining arrangement of the sub object on the basis of the current position of the user. Therefore, it is possible to encourage the user to play the video game even in a case where the user cannot move in the real space.

Fourth Embodiment

Figure 10:
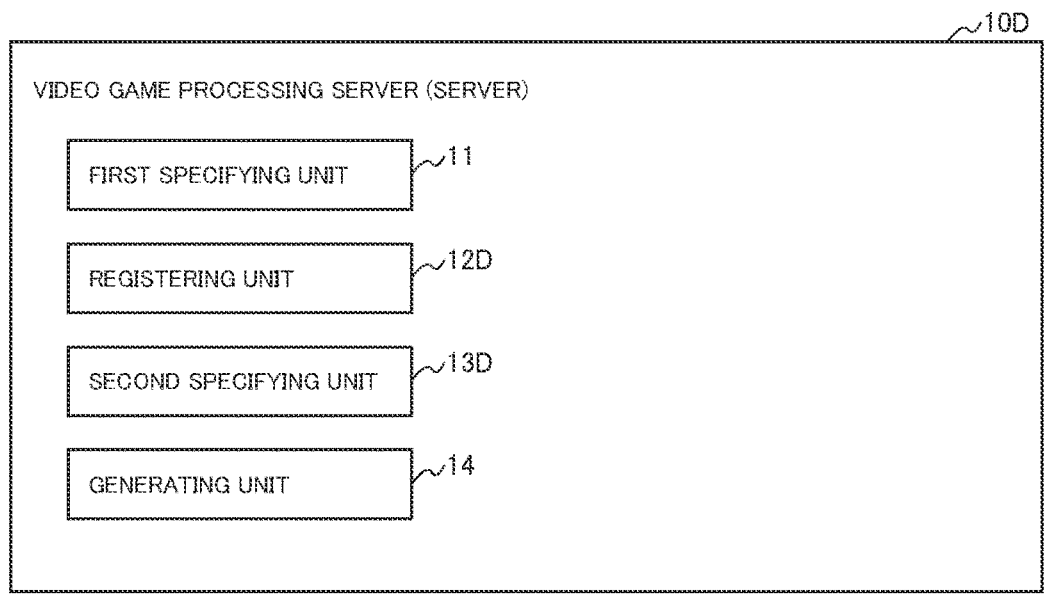
FIG. 10 is a block diagram illustrating a configuration of a server corresponding to at least one of the embodiments of the present disclosure.

FIG. 10 is a block diagram illustrating a configuration of a video game processing server 10D (hereinafter, referred to as a "server 10D"), which is an example of the video game processing server 10. In the present embodiment, the server 10D at least includes a first specifying unit 11, a registering unit 12D, a second specifying unit 13D, and a generating unit 14.

The registering unit 12D has a function to register a position of a user when the object and the user are registered in a storage unit so as to be associated with each other in the storage unit (hereinafter, referred to as a "registered position").

Here, a configuration to register a registered position is not limited particularly. The registering unit 12D may be configured so that other information is also registered in addition to positional information at the time of registration thereof. As an example of such a configuration, there is a configuration in which a registered position, a direction of a user at the time of registration, and a positional relationship between the registered position and an object are registered.

The second specifying unit 13D has a function to specify, in a case where the registered position corresponding to the object selected by the user is registered, a second target virtual space including the object by changing a current position of the user into the registered position.

Here, the phrase "specify a second target virtual space including the object by changing a current position of the user into the registered position means that information containing a position after change is defined as information indicating a virtual space that a user terminal is caused to display. A configuration to specify a virtual space by changing a current position of the user is not limited particularly. However, it is preferable that the second specifying unit 13D is configured so that the user can recognize that the current position of the user is changed as an object selection result by the user. As an example of such a configuration, there is a configuration in which a virtual space around a current position of a user after change is drawn in a game screen that is displayed on a display screen of a user terminal 20.

Figure 11:
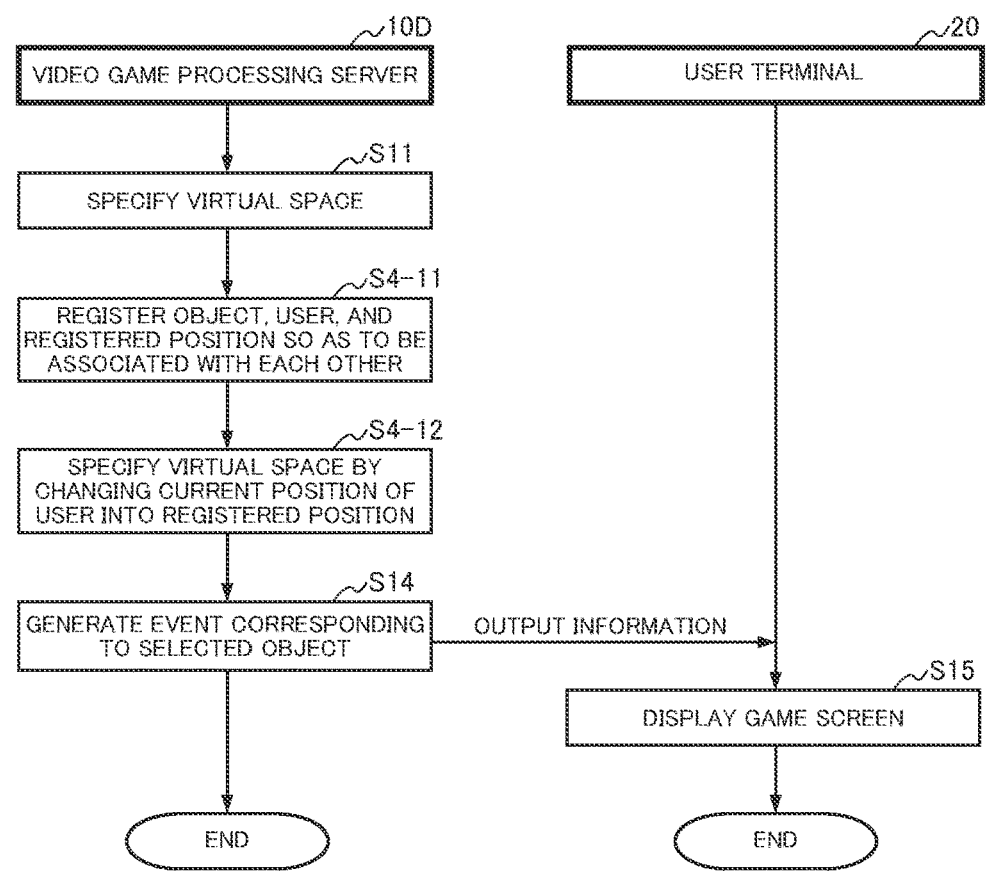
FIG. 11 is a flowchart illustrating an example of game processing corresponding to at least one of the embodiments of the present disclosure.

FIG. 11 is a flowchart illustrating an example of game processing executed by a video game processing system 100. Hereinafter, operations of the server 10D and the user terminal 20 (hereinafter, referred to as the "terminal 20") will be described as an example. In this regard, a flowchart illustrating an operation of each of the server 10D and the terminal 20 is omitted from a point of view to avoid repeated explanation.

When a virtual space is specified, the server 10D registers an object, a user, and a registered position so as to be associated with each other (Step S4-11). In the present embodiment, in a case where a registration operation for an object that is positioned in the specified virtual space is received, the server 10D registers identification information of the object and the user and a coordinate indicating a current position of the user at this time in a predetermined storage unit.

After the registered position and the like are registered, the server 10D specifies a second target virtual space by changing the current position of the user into the registered position (Step S4-12). In the present embodiment, in a case where an object selected by the user among registered objects has the registered position, the server 10D changes the current position of the user into the registered position.

As explained above, as one side of the fourth embodiment, the server 10D that controls progress of the video game using the virtual space corresponding to the map information of a real space and the positional information of the user terminal is configured so as to include the first specifying unit 11, the registering unit 12D, the second specifying unit 13D, and the generating unit 14. Thus, the registering unit 12D registers the position of the user when the object and the user are registered in a storage unit so as to be associated with each other in the storage unit (that is, the registered position); and the second specifying unit 13D specifies, in a case where the registered position corresponding to the object selected by the user is registered, the second target virtual space including the object by changing the current position of the user into the registered position. Therefore, it is possible to encourage the user to play the video game by virtually moving the current position of the user even in a case where the user cannot move in the real space.

Fifth Embodiment

Figure 12:
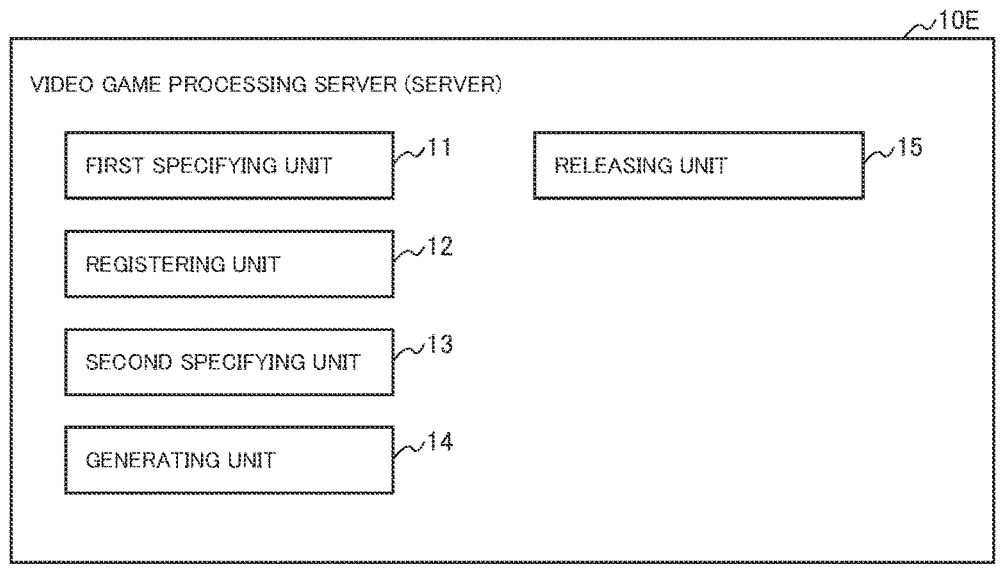
FIG. 12 is a block diagram illustrating a configuration of a server corresponding to at least one of the embodiments of the present disclosure.

FIG. 12 is a block diagram illustrating a configuration of a video game processing server 10E (hereinafter, referred to as a "server 10E"), which is an example of the video game processing server 10. In the present embodiment, the server 10E at least includes a first specifying unit 11, a registering unit 12, a second specifying unit 13, a generating unit 14, and a releasing unit 15.

The releasing unit 15 has a function to release registration of an object that satisfies a predetermined rearrangement condition among registered objects.

Here, a configuration of the rearrangement condition is not limited particularly. However, it is preferable that a user can recognize the rearrangement condition. As examples of such a configuration, there are a condition that a predetermined time elapses from registration, a condition that it becomes a predetermined time in one day, and a condition that a registered object is selected by a user and an event is thus terminated.

Further, the phrase "release registration of an object" means that an object is set to a state where the user cannot select the object. A configuration to release registration of an object is not limited particularly. However, it is preferable that the user can recognize that registration is released. As an example of such a configuration, there is a configuration in which in a case where a rearrangement condition is satisfied or in a case where another release condition is satisfied, information on an object is erased from a storage unit and a user is informed that registration is released.

Figure 13:
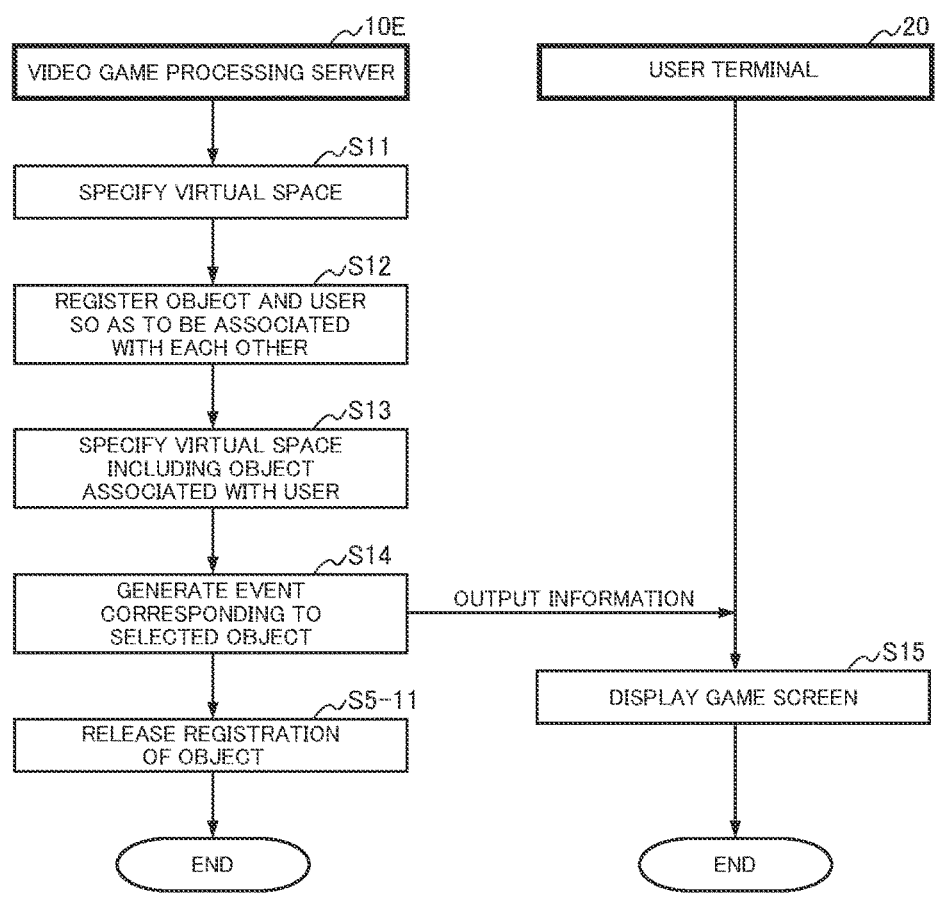
FIG. 13 is a flowchart illustrating an example of game processing corresponding to at least one of the embodiments of the present disclosure.

FIG. 13 is a flowchart illustrating an example of game processing executed by a video game processing system 100. Hereinafter, operations of the server 10E and a user terminal 20 will be described as an example. In this regard, a flowchart illustrating an operation of each of the server 10E and the user terminal 20 is omitted from a point of view to avoid repeated explanation.

When an event corresponding to a selected object is generated, the server 10E releases registration of an object (Step S5-11). In the present embodiment, the server 10E deletes information on an object for which an event is generated in a storage unit.

As explained above, as one side of the fifth embodiment, the server 10E that controls progress of the video game using a virtual space corresponding to map information of a real space and positional information of the user terminal is configured so as to include the first specifying unit 11, the registering unit 12, the second specifying unit 13, the generating unit 14, and the releasing unit 15. Thus, the releasing unit 15 releases the registration of the object that satisfies the predetermined rearrangement condition among the registered objects. Therefore, it is possible to encourage the user to move in the real space.

Sixth Embodiment

Figure 14:
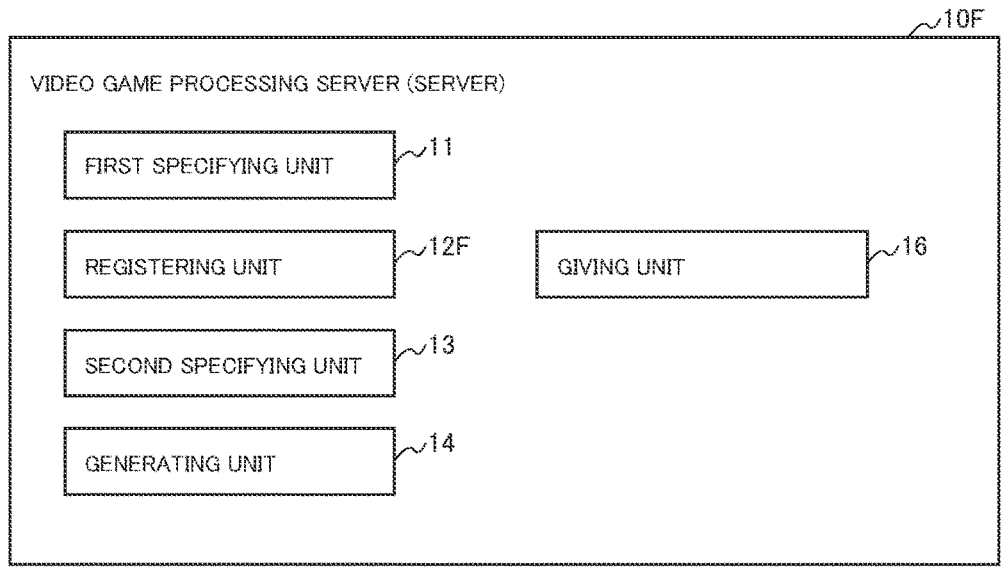
FIG. 14 is a block diagram illustrating a configuration of a server corresponding to at least one of the embodiments of the present disclosure.

FIG. 14 is a block diagram illustrating a configuration of a video game processing server 10F (hereinafter, referred to as a "server 10F"), which is an example of the video game processing server 10. In the present embodiment, the server 10F at least includes a first specifying unit 11, a registering unit 12F, a second specifying unit 13, a generating unit 14, and a giving unit 16.

The giving unit 16 has a function to give a point to a user in a case where the user satisfies a predetermined giving condition regarding an object that is positioned in a virtual space.

Here, a configuration of the giving condition is not limited particularly so long as the giving condition is related to the object that is positioned in the virtual space. As examples of such a configuration, there are a condition that a user wins a battle against an object positioned in a virtual space, and a condition that a user touches an object positioned in a virtual space. In this regard, the giving unit 16 may be configured so that the user can obtain a point in a video game even by a method different from the giving condition regarding the object positioned in the virtual space, such as consumption of an item, billing, movement in a real space (for example, the number of steps), for example.

Further, a configuration to give a point to a user is not limited particularly. The giving unit 16 may be configured so as to give an amount of points corresponding to a type of giving condition, or may be configured so as to give an amount of points corresponding to a parameter of the user. In this regard, it is preferable that the amount of points (or the number of points) possessed by the user is displayed on a game screen in response to a user operation as a result of a situation that a point is given to the user.

The registering unit 12F has a function to register the object and the user in a storage unit so as to be associated with each other in exchange for consumption of the point possessed by the user.

Here, a configuration to cause the user to consume a point is not limited particularly so long as the registering unit 12F is configured so that the user can recognize that a point is consumed. As examples of such a configuration, there are a configuration in which a certain point is subtracted from a possessed point in a case where an object is selected, and a configuration in which a point required for registration of a selected object is presented to a user and the point is subtracted from a possessed point in a case where the user allows it.

Figure 15:
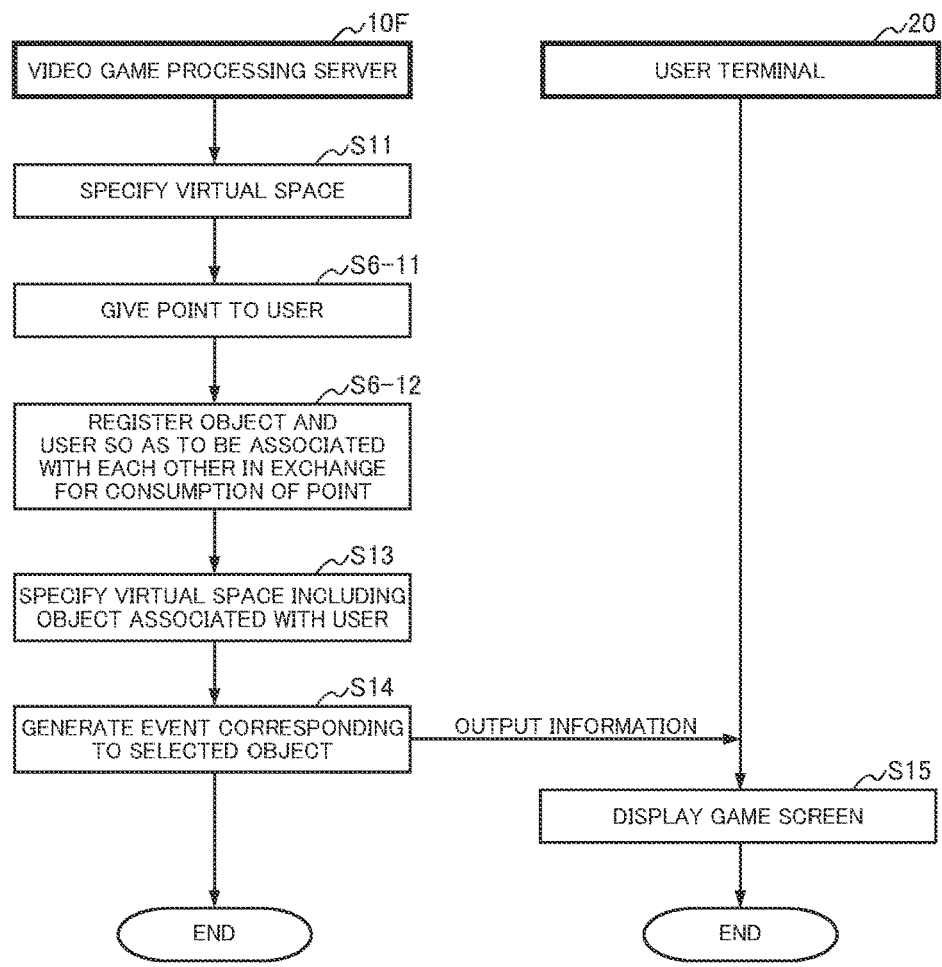
FIG. 15 is a flowchart illustrating an example of game processing corresponding to at least one of the embodiments of the present disclosure.

FIG. 15 is a flowchart illustrating an example of game processing executed by a video game processing system 100. Hereinafter, operations of the server 10F and the user terminal 20 will be described as an example. In this regard, a flowchart illustrating an operation of each of the server 10F and the user terminal 20 is omitted from a point of view to avoid repeated explanation.

When a virtual space is specified, the server 10F gives a point to a user (Step S6-11). In the present embodiment, in a case where the user satisfies a giving condition in the virtual space, the server 10F gives a point corresponding to the satisfied giving condition to the user.

When the point is given to the user, the server 10F registers an object and the user so as to be associated with each other in exchange for consumption of a certain point (Step S6-12). In the present embodiment, in a case where the user who selects an object positioned in the virtual space wants to register the object, the server 10F subtracts a point required for registration of the object from a point possessed by the user, and registers the object.

As explained above, as one side of the sixth embodiment, the server 10F that controls progress of the video game using the virtual space corresponding to the map information of the real space and the positional information of the user terminal is configured so as to include the first specifying unit 11, the registering unit 12F, the second specifying unit 13, the generating unit 14, and the giving unit 16. Thus, the giving unit 16 gives the point of the user in a case where the user satisfies the predetermined giving condition regarding the object that is positioned in the virtual space, and the registering unit 12F registers the object and the user in the storage unit so as to be associated with each other in exchange for consumption of the point possessed by the user. Therefore, it is possible to cause the user to use actual performance of playing the video game while moving in the real space in a case where the user cannot move in the real space, and this makes it possible to improve interest of the user in the video game in which movement of the real space is used.

Seventh Embodiment

Figures 16, 17:
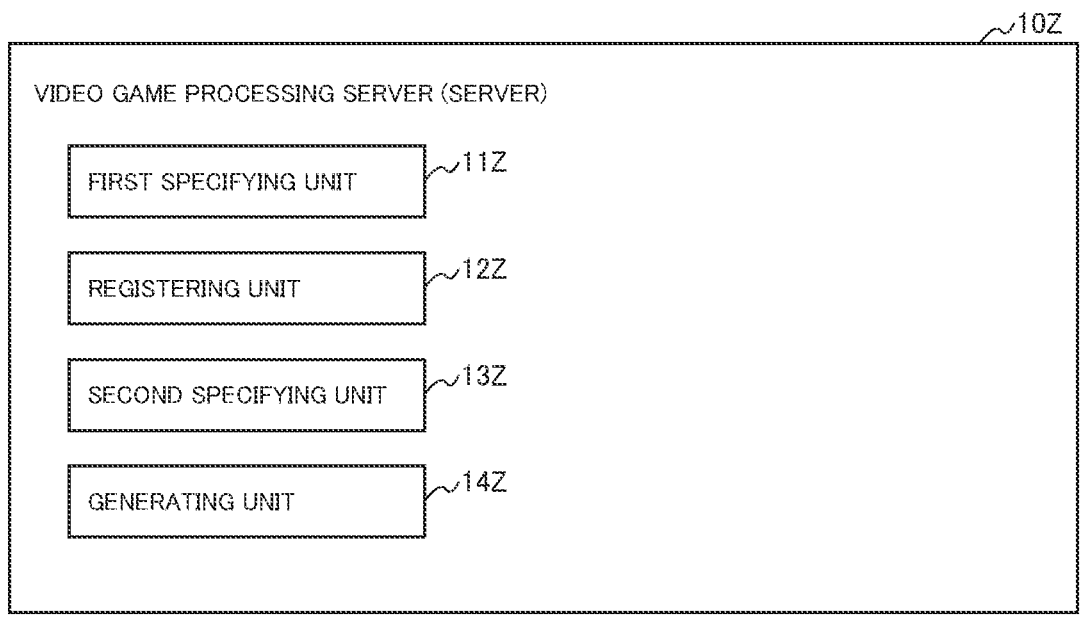
FIG. 16 is a block diagram illustrating a configuration of a server corresponding to at least one of the embodiments of the present disclosure.
FIG. 17 is a table including an example of a storage state of information corresponding to at least one of the embodiments of the present disclosure.

FIG. 16 is a block diagram illustrating a configuration of a video game processing server 10Z (hereinafter, referred to as a "server 10Z"), which is an example of the video game processing server 10. In the present embodiment, the server 10Z at least includes a first specifying unit 11Z, a registering unit 12Z, a second specifying unit 13Z, and a generating unit 14Z.

The first specifying unit 11Z has a function to specify at least a part of a virtual space as a virtual space (that is, a first target virtual space), which the user terminal is caused to display, on the basis of virtual space related information and a position of the user. An object that appears in the video game and positional information of the virtual space are associated with each other in the virtual space related information. The position of the user is specified from the positional information of the user terminal.

Here, the object means one of various targets in the video game. Hereinafter, a case where various kinds of objects appear in the virtual space will be described as an example.

Further, the positional information of the virtual space means information for specifying a position in the virtual space. Hereinafter, a case where the position of the user in the real space is reflected to the position of the user in the virtual space (that is, a position of a user character operated by the user) will be described as an example. In this regard, in the present embodiment, the user needs to move in the real space in principle in order to cause the position of the user character to move in the virtual space. However, in a case where the user satisfies a condition, it is possible to move the position of the user character exceptionally or temporarily.

Further, a configuration to specify the position of the user from the positional information of the user terminal is not limited particularly. However, it is preferable that the position of the user is specified in real time in accordance with movement of the user terminal. Hereinafter, a case where the position of the user is specified by a known method using GPS information will be described as an example.

Further, a configuration to specify a virtual space on the basis of virtual space related information and a user position is not limited particularly. However, it is preferable that the first specifying unit 11Z is configured so that the user can recognize that the movement of the user terminal in the real space is reflected to the virtual space. Hereinafter, a case where an area with a predetermined form based on the position of the user is specified as a virtual space that is to be displayed as a game screen will be described as an example.

Further, the phrase "specify at least a part of the virtual space as the virtual space that the user terminal is caused to display" means that a configuration of the virtual space that the user terminal is caused to display is defined. Hereinafter, a case where an object existing in the virtual space is specified as information for constituting the virtual space will be described as an example.

The registering unit 12Z has a function to register the object and the user in a storage unit (not illustrated in the drawings) so as to be associated with each other on the basis of a position of the object and the position of the user.

Here, a configuration to associate the object with the user is not limited particularly so long as it is a configuration based on each other's position. However, it is preferable that the registering unit 12 is configured so that a registration condition includes a fact that a distance between a user and an object is close to each other to an extent. Hereinafter, a case where an object on a game screen touched by the user is registered so as to be associated with the user will be described as an example.

The second specifying unit 13Z has a function to specify a virtual space including an object or another object related to the object (that is, a second target virtual space) as the virtual space that the user terminal is caused to display in a case where the object associated with the user is selected by the user.

Here, a configuration to cause the user to select the object associated with the user is not limited particularly. However, it is preferable that the second specifying unit 13 is configured so that an arbitrary object can be selected in a case where a plurality of objects is associated with each other. Hereinafter, a case where the user is caused to select one object from a list of objects associated with the user will be described as an example.

Further, a configuration of another object related to the object (that is, a related object) is not limited particularly so long as the user can recognize association with the object.

Hereinafter, a case where a so-called dungeon includes an enemy character and an item will be described as an example.

The generating unit 14Z has a function to generate an event corresponding to an object in a case where the object that is positioned within an area of the specified virtual space is selected by the user.

Here, a configuration to specify the virtual space is not limited particularly so long as it includes a configuration to specify the first target virtual space by the first specifying unit 11Z and a configuration to specify the second target virtual space by the second specifying unit 13Z. Further, a configuration to cause the user to select any object is not limited particularly so long as the user can recognize a selection result. Hereinafter, a case where an event corresponding to an object positioned on the game screen, which corresponds to the specified virtual space, is generated in a case a user touches the object will be described as an example.

Further, the event means any of various kinds of occurrences that can be generated in the video game. A configuration of the event is not limited particularly. However, it is preferable that the configuration is according to a kind of object. Hereinafter, a battle against an enemy character or search of a dungeon will be described as an example.

FIG. 17 is a table including an example of a storage state of information stored in a storage unit (not illustrated in the drawings) included in the server 10Z. As illustrated in FIG. 17, the storage unit stores a user name, tough enemies, and dungeons therein as registered object related information so as to be associated with each other.

Here, the user name means a name of a user in the video game. The user name may be used as information for identifying the user.

Further, a tough enemy means a part of enemy characters, which can be registered so as to be associated with the user, among various kinds of objects that appear in the video game. In the present embodiment, the tough enemy is stored so as to be associated with the user in response to selection of the user. In this regard, a configuration to determine whether the user selects an object or not is not limited particularly. The server 10Z may be configured so as to determine that the user selects an object in a case where the user touches the object, or may be configured so that an object that satisfies a selection condition is selected regardless of a user operation. In this case, as examples of the selection condition, there is a condition that a distance from a user is within a predetermined range, and a condition that the object is an object specified by a user.

Further, the dungeon means an object that the user can search. In the present embodiment, the dungeon is stored so as to be associated with the user as well as the tough enemy.

Figure 18:
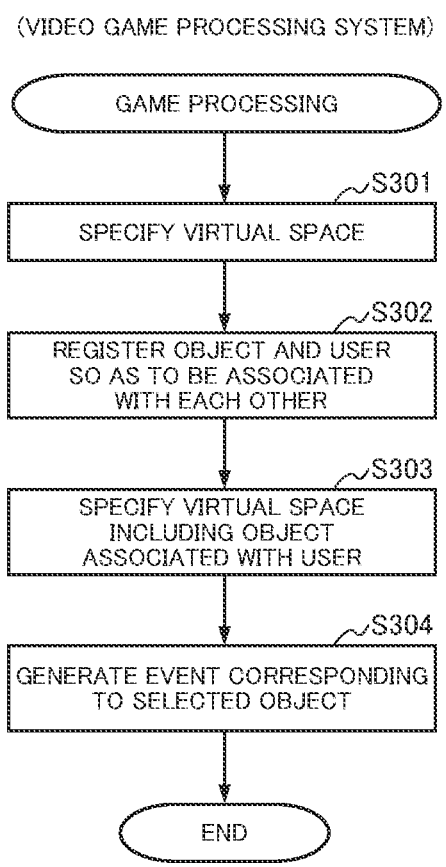
FIG. 18 is a flowchart illustrating an example of game processing corresponding to at least one of the embodiments of the present disclosure.

FIG. 18 is a flowchart illustrating an example of game processing executed by user's a video game processing system 100Z (hereinafter, referred to as a "system 100Z") provided with the server 10Z. In the game processing according to the present embodiment, processes related to a control of progress of a video game using the positional information of the user terminal 20 (hereinafter, referred to as the "terminal 20") in response to an operation of the user are executed. Hereinafter, each of the processes will be described. In this regard, the order of the processes may be changed without any contradiction or the like of processing content.

The game processing is started as an opportunity that the terminal 20 accessing the server 10Z requests display of a virtual space, for example.

In the game processing, the system 100Z first specifies a virtual space (Step S301). In the present embodiment, the system 100Z specifies a virtual space, in which a user character of a user is positioned, on the basis of positional information of the terminal 20 operated by the user. Further, in the present embodiment, on the basis of elements each of which changes in accordance with progress of the video game, a recovery spot where a parameter of the user character is recovered, enemy characters each of which becomes an opponent of the user character, a tough enemy to which special element is set among the enemy characters, and a dungeon that becomes a search target of the user character are specified as objects arranged in the virtual space.

Figure 19:
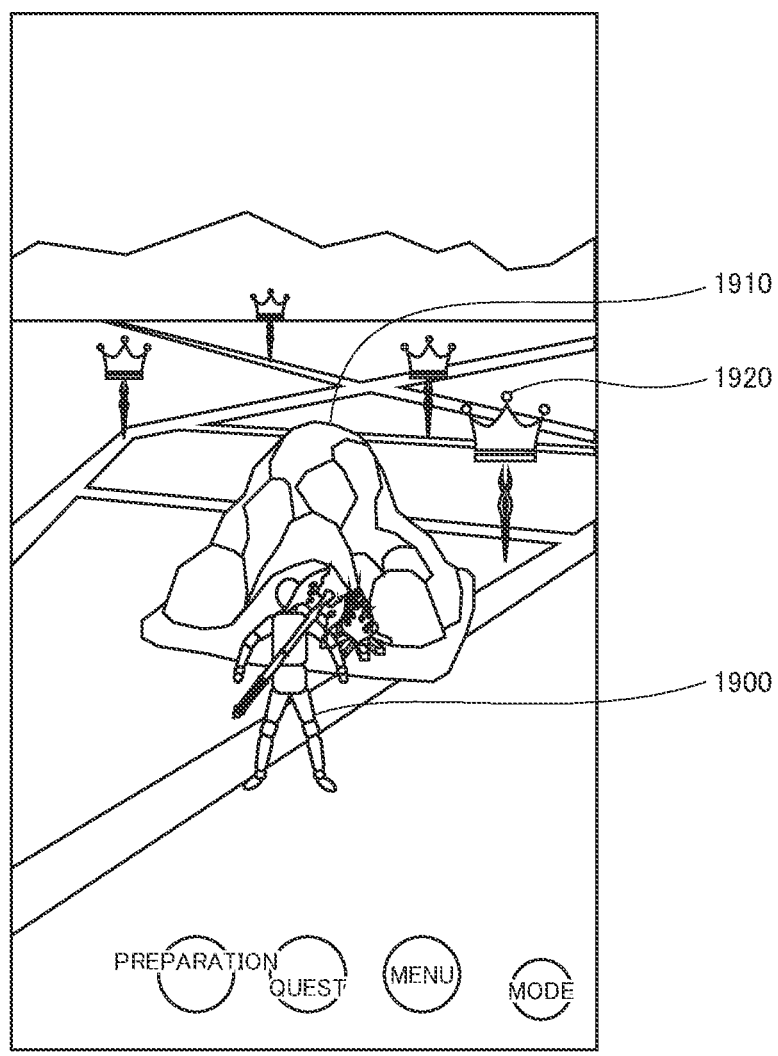
FIG. 19 is a schematic diagram illustrating an example of a display screen corresponding to at least one of the embodiments of the present disclosure.

FIG. 19 is a schematic diagram illustrating an example of a game screen corresponding to at least one of the embodiments of the present disclosure. As illustrated in FIG. 19, a state where a user character 1900 is positioned in a specified virtual space is drawn in the game screen. Further, various kinds of objects such as a dungeon 1910 and marks 1920 each indicating an appearance position of the recovery spot are displayed in the virtual space.

When the virtual space is specified, the system 100Z registers an object and the user so as to be associated with each other (Step S302). In the present embodiment, when the user wins a battle or taps the recovery spot, a point for registering the object is collected. When the user visits a dungeon or encounters a tough enemy, this point can be used to register the dungeon or the tough enemy in a list of the user. In this regard, the system 100Z may be configured so that a point is given to the user even by a method different from a giving condition regarding the object that is positioned in the virtual space, for example, consumption of an item, billing, or movement in a real space (for example, the number of steps taken in walking).

Here, the list means a list or table of objects registered by the user. When a dungeon or the like is registered, it becomes effective for only a remaining time from registration to rearrangement, and the user can thus use the registered dungeon or the like from a current position thereof. In this regard, the dungeon or the like registered by the user disappears from a map indicating the virtual space, and is arranged in the map again after 24 hours. For that reason, the dungeon or the like becomes effective for up to 24 hours after the registration. Namely, when a tough enemy or a dungeon is rearranged, it disappears from the list.

Further, in the present embodiment, required points increase in accordance with the number of times of registration. For example, 150 points are required to register a dungeon first time; 200 points are required to register it next; and 400 points are required to further register it. Further, it is possible to register any dungeon or the like up to three times each day. This is managed individually between dungeons and tough enemies. Namely, for example, 200 points are required to register a tough enemy first time; 400 points are required to register it next; and 700 points are required to further register it. In this regard, in the present embodiment, the number of times of registration for each dungeon or tough enemy is reset at a predetermined time (3:00) every day. In addition, there is an upper limit to the number of cases that can be registered per day. However, there is no need to limit the number of registration cases in the list.

With respect to the objects registered in the list, the user is allowed to jump from the list at desired timing. In this regard, information that can be registered in the list is not limited to the objects, and may be configured so as to contain various kings of content. A configuration of the content other than the object is not limited particularly. However, it is preferable that the system 100Z is configured so that in a case where the user cannot move in the real space, the user can use a past action history for the content other than the object. As an example of such a configuration, there is a story that was reproduced in a dungeon search.

In this regard, a configuration to register the object in the list is not limited particularly. However, it is preferable that the system 100Z is configured so that in a case where the user selects an object, the user can select whether to execute an event corresponding to the object or register the object in the list. Namely, in the present embodiment, when the user taps a dungeon displayed on a display screen, a game screen that includes a dungeon name, a recommended level, choices of whether to enter the dungeon or not, and a button to register the dungeon in the list is displayed. Further, when the user taps a tough enemy displayed on the display screen, a game screen that includes a tough enemy name, a level of the tough enemy, a subjugation regard, choices of whether to fight against the tough enemy or not, and a button to register the dungeon in the list is displayed.

When the object and the user are registered so as to be associated with each other, the system 100Z specifies a virtual space including the object associated with the user (Step S303). In the present embodiment, the user can cause the user terminal 20 to display the list on the game screen, and select an object that the user wants to use from the list. With respect to the user who selects a dungeon registered in the list, a position of the user keeps a current position, but the surroundings of the user become the registered dungeon. In the present embodiment, a boss and treasure boxes appear within a tap area.

Figure 20:
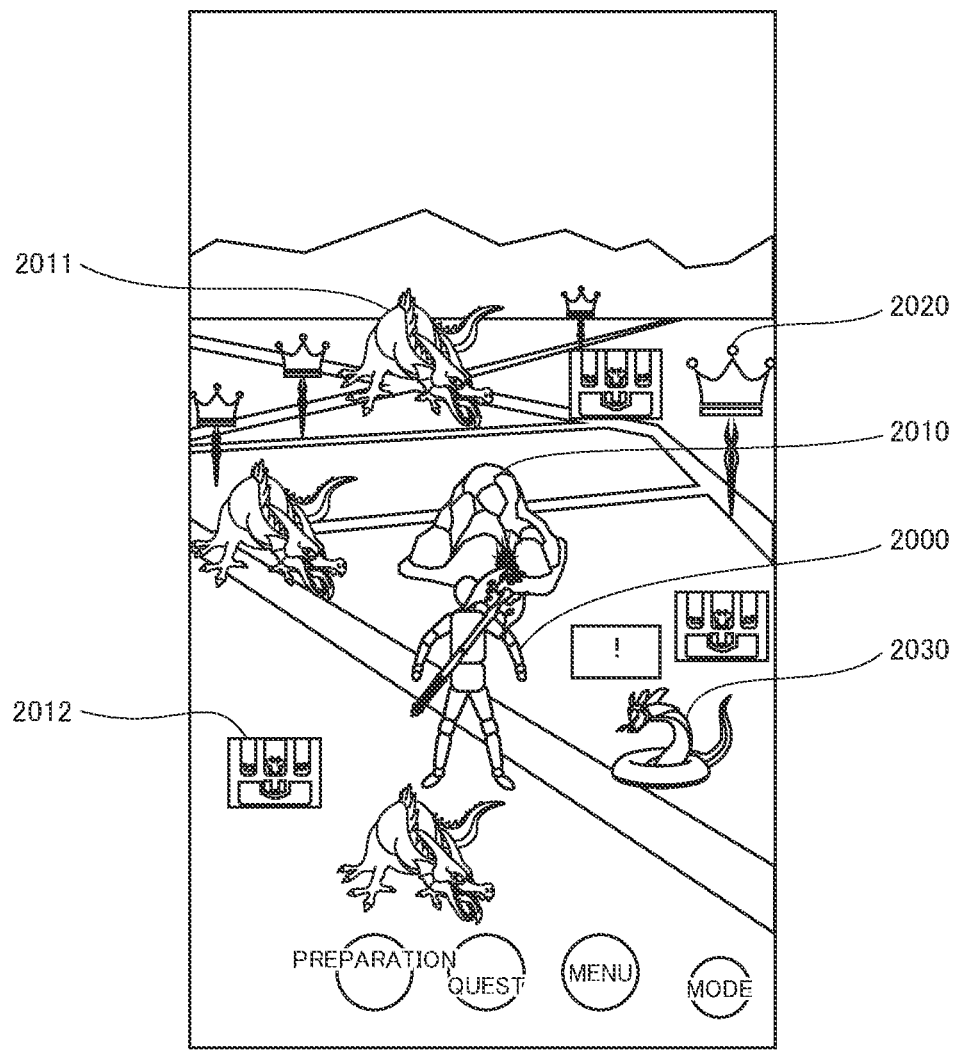
FIG. 20 is a schematic diagram illustrating another example of the display screen corresponding to at least one of the embodiments of the present disclosure.

FIG. 20 is a schematic diagram illustrating an example of the game screen. As illustrated in FIG. 20, a dungeon 2010 selected from a list, a boss 2011 corresponding to the dungeon, and treasure boxes 2012 corresponding to the dungeon are drawn around a user character 2000 on a game screen. In this regard, marks 2020 and an enemy character 2030 may be drawn in a virtual space as objects that are not affected by the dungeon.

When the virtual space including the object associated with the user is specified, the system 100Z generates an event corresponding to the selected object (Step S304). In the present embodiment, the event corresponding to the object selected by the user is generated in the virtual space including the dungeon selected from the list by the user. Namely, in FIG. 20, for example, in a case where the boss 2011 is selected, a battle event against the boss 2011 is generated. Further, in a case where any of the treasure boxes 2012 is selected, an event for obtaining the corresponding treasure box is generated. Further, in a case where the user selects a tough enemy from the list, a current position of the user is moved to a position at which the tough enemy is registered (or a position of the tough enemy), a challenge event to the tough enemy is generated. In this regard, the position of the user returns to the place before the movement (or a current position corresponding to a position of the user terminal in the real space) regardless of whether the user wins or loose the battle against the tough enemy, and the tough enemy disappears from the list. By configuring the system 100Z in this manner, it is possible to prevent an action of resetting the battle against the tough enemy until the user defeats the tough enemy.

As explained above, as one side of the seventh embodiment, the system 100Z that controls progress of the video game using the virtual space corresponding to the map information of the real space and the positional information of the user terminal is configured so as to include the first specifying unit 11Z, the registering unit 12Z, the second specifying unit 13Z, and the generating unit 14Z. Thus, the first specifying unit 11Z specifies at least a part of the virtual space as the first target virtual space, which the user terminal is caused to display, on the basis of virtual space related information and a position of the user, an object that appears in the video game (for example, the dungeon and the tough enemy) and positional information of the virtual space being associated with each other in the virtual space related information, the position of the user being specified from the positional information of the user terminal; the registering unit 12Z registers the object and the user in the storage unit so as to be associated with each other on the basis of the position of the object and the position of the user (for example, registration to the list); the second specifying unit 13Z specifies the second target virtual space including the object or another object related to the object as the virtual space that the user terminal is caused to display in a case where the object associated with the user is selected by the user (for example, specification of a map including a tough enemy, or a map including a dungeon, a boss, and a treasure box); and the generating unit 14Z generates the event corresponding to the object (for example, challenge to the tough enemy, or a battle against the boss) in a case where the object that is positioned within the area of the specified virtual space is selected by the user (for example, tap on an object). Therefore, it is possible to prevent the user from losing interest in the video game.

Namely, the user can register an object when the user is playing the video game while moving in the real space, and the user can also summon or call the registered object in a situation where the user cannot move in the real space to play the video game. Therefore, it is possible for the user to enjoy the video game even in the situation where the user cannot move in the real space.

Further, in the example of the seventh embodiment described above, the system 100Z is configured so as to increase or decrease a point required for the user to register the object in accordance with a predetermined update rule regarding the number of times the object and the user are registered in the storage unit so as to be associated with each other (for example, a required point is increased in accordance with the number of times the tough enemy is registered, and it resets at 3 o'clock). Therefore, it is possible to prevent the user from losing interest in movement in the real space.

Further, in the example of the seventh embodiment described above, the system 100Z is configured so as to manage the number of times each of a plurality of kinds of objects is registered (for example, individually manage the number of times the tough enemy or the dungeon is registered in the list), and so as not to execute (e.g., to stop) new registration until a predetermined reset condition is satisfied with respect to a kind of object that has been registered by the predetermined upper limit number of times (for example, when a tough enemy is registered three times, the tough enemy cannot be registered until the number of times of registration reset at 3 o'clock next day). Therefore, it is possible to prevent the user from losing interest in movement in the real space.

As explained above, one shortage or two or more shortages can be solved by each of the embodiments according to the present application. In this regard, the effects by each of the embodiments are non-limiting effects or one example of the non-limiting effects.

In this regard, in each of the embodiments described above, each of the plurality of user terminals 20, and 201 to 20N and the server 10 executes the various kinds of processing described above in accordance with various kinds of control programs (for example, a video game processing program) stored in the storage device with which the corresponding terminal or server is provided.

Further, the configuration of the video game processing system 100 is not limited to the configuration that has been explained as an example of each of the embodiments described above. For example, the system 100 may be configured so that the server 10 executes a part or all of the processes that have been explained as the processes executed by the user terminal 20. Alternatively, the system 100 may be configured so that any of the plurality of user terminals 20, and 201 to 20N (for example, the user terminal 20) executes a part or all of the processes that have been explained as the processes executed by the server 10. Further, the system 100 may be configured so that a part or all of the storage unit included in the server 10 is included in any of the plurality of user terminals 20, and 201 to 20N. Namely, the system 100 may be configured so that a part or all of the functions of any one of the user terminal 20 and the server 10 according to the system 100 is included in the other.

Further, the system 100 may be configured so that the program causes a single apparatus to perform a part or all of the functions that have been explained as the example of each of the embodiments described above without including a communication network.

APPENDIX

The explanation of the embodiments described above has been described so that the following embodiments can be at least performed by a person having a normal skill in the art to which the present disclosure belongs.

(1)

A non-transitory computer-readable medium including a video game processing program for causing a server to perform functions to control progress of a video game using a virtual space corresponding to map information of a real space and positional information of a user terminal of a user, the functions comprising:

a first specifying function configured to specify at least a part of the virtual space as a first target virtual space on a basis of virtual space related information and a position of the user, an object that appears in the video game and positional information of the virtual space being associated with each other in the virtual space related information, the position of the user being specified from the positional information of the user terminal, the user terminal being caused to display the virtual space;

a registering function configured to register the object and the user in a storage unit so as to be associated with each other on a basis of a position of the object and the position of the user;

a second specifying function configured to specify a second target virtual space as the virtual space that the user terminal is caused to display in a case where the object associated with the user is selected by the user, the second target virtual space including the object or another object related to the object; and a generating function configured to generate an event corresponding to an object in a case where the object that is positioned within an area of the first target virtual space or the second target virtual space respectively specified by the first specifying function or the second specifying function is selected by the user.

(2)

The non-transitory computer-readable medium according to (1), wherein the second specifying function includes a function configured to specify the second target virtual space including the object by changing a position of the object selected by the user in the virtual space on a basis of a current position of the user.

(3)

The non-transitory computer-readable medium according to (1) or (2), wherein the second specifying function includes a function configured to specify, in a case where the object selected by the user includes at least one sub object, the second target virtual space including the sub object by determining arrangement of the sub object on a basis of a current position of the user.

(4)

The non-transitory computer-readable medium according to any one of (1) to (3), wherein the registering function includes a function configured to register a position of the user when the object and the user are registered in the storage unit so as to be associated with each other as a registered position in the storage unit, and wherein the second specifying function includes a function configured to specify, in a case where the registered position corresponding to the object selected by the user is registered, the second target virtual space including the object by changing a current position of the user into the registered position.

(5)

The non-transitory computer-readable medium according to any one of (1) to (4), the functions further comprising:

a releasing function configured to release registration of an object that satisfies a predetermined rearrangement condition among the objects registered by the registering function.

(6)

The non-transitory computer-readable medium according to any one of (1) to (5), the functions further comprising:

a giving function configured to give a point to the user in a case where the user satisfies a predetermined giving condition regarding the object that is positioned in the virtual space, wherein the registering function includes a function configured to register the object and the user in the storage unit so as to be associated with each other in exchange for consumption of the point possessed by the user.

(7)

The non-transitory computer-readable medium according to any one of (1) to (6), wherein the registering function includes a function configured to increase or decrease a point required for the user to register the object in accordance with a predetermined update rule regarding a number of times the object and the user are registered in the storage unit so as to be associated with each other.

(8)

The non-transitory computer-readable medium according to any one of (1) to (7), wherein the registering function includes a function configured so as to manage a number of times each of a plurality of kinds of objects is registered, and so as not to execute new registration in the storage unit until a predetermined reset condition is satisfied with respect to a kind of object that has been registered by a predetermined upper limit number of times.

(9)

A non-transitory computer-readable medium including a video game processing program for causing a user terminal to perform at least one function of the functions that the video game processing program described in any one of (1) to (8) causes the server to perform, the user terminal being capable of communicating with the server.

(10)

A video game processing system for controlling progress of a video game using a virtual space corresponding to map information of a real space and positional information of a user terminal of a user, the video game processing system comprising a communication network, a server, and the user terminal, the video game processing system further comprising:

a first specifier configured to specify at least a part of the virtual space as a first target virtual space on a basis of virtual space related information and a position of the user, an object that appears in the video game and positional information of the virtual space being associated with each other in the virtual space related information, the position of the user being specified from the positional information of the user terminal, the user terminal being caused to display the virtual space;

a registerer configured to register the object and the user in a storage unit so as to be associated with each other on a basis of a position of the object and the position of the user;

a second specifier configured to specify a second target virtual space as the virtual space that the user terminal is caused to display in a case where the object associated with the user is selected by the user, the second target virtual space including the object or another object related to the object; and a generator configured to generate an event corresponding to an object in a case where the object that is positioned within an area of the first target virtual space or the second target virtual space respectively specified by the first specifier or the second specifier is selected by the user.

(11)

The video game processing system according to (10), wherein the server includes the first specifier, the registerer, the second specifier, and the generator, and wherein the user terminal includes an output controller configured to output a game screen to a display screen of a display device, the game screen indicating a state that the event is generated by the generator.

(12)

A non-transitory computer-readable medium including a video game processing program for causing a user terminal to perform functions to control progress of a video game using a virtual space corresponding to map information of a real space and positional information of a user terminal of a user, the functions comprising:

a first specifying function configured to specify at least a part of the virtual space as a first target virtual space on a basis of virtual space related information and a position of the user, an object that appears in the video game and positional information of the virtual space being associated with each other in the virtual space related information, the position of the user being specified from the positional information of the user terminal, the user terminal being caused to display the virtual space;

a registering function configured to register the object and the user in a storage unit so as to be associated with each other on a basis of a position of the object and the position of the user;

a second specifying function configured to specify a second target virtual space as the virtual space that the user terminal is caused to display in a case where the object associated with the user is selected by the user, the second target virtual space including the object or another object related to the object; and a generating function configured to generate an event corresponding to an object in a case where the object that is positioned within an area of the first target virtual space or the second target virtual space respectively specified by the first specifying function or the second specifying function is selected by the user.

(13)

A video game processing method of controlling progress of a video game using a virtual space corresponding to map information of a real space and positional information of a user terminal of a user, the video game processing method comprising:

a first specifying process configured to specify at least a part of the virtual space as a first target virtual space on a basis of virtual space related information and a position of the user, an object that appears in the video game and positional information of the virtual space being associated with each other in the virtual space related information, the position of the user being specified from the positional information of the user terminal, the user terminal being caused to display the virtual space;

a registering process configured to register the object and the user in a storage unit so as to be associated with each other on a basis of a position of the object and the position of the user;

a second specifying process configured to specify a second target virtual space as the virtual space that the user terminal is caused to display in a case where the object associated with the user is selected by the user, the second target virtual space including the object or another object related to the object; and a generating process configured to generate an event corresponding to an object in a case where the object that is positioned within an area of the first target virtual space or the second target virtual space respectively specified by the first specifying function or the second specifying function is selected by the user.

(14)

A video game processing method of controlling progress of a video game by a video game processing system using a virtual space corresponding to map information of a real space and positional information of a user terminal of a user, the video game processing system comprising a communication network, a server, and the user terminal, the video game processing method comprising:

a first specifying process configured to specify at least a part of the virtual space as a first target virtual space on a basis of virtual space related information and a position of the user, an object that appears in the video game and positional information of the virtual space being associated with each other in the virtual space related information, the position of the user being specified from the positional information of the user terminal, the user terminal being caused to display the virtual space:

a registering process configured to register the object and the user in a storage unit so as to be associated with each other on a basis of a position of the object and the position of the user;

a second specifying process configured to specify a second target virtual space as the virtual space that the user terminal is caused to display in a case where the object associated with the user is selected by the user, the second target virtual space including the object or another object related to the object; and a generating process configured to generate an event corresponding to an object in a case where the object that is positioned within an area of the first target virtual space or the second target virtual space respectively specified by the first specifying function or the second specifying function is selected by the user.

INDUSTRIAL APPLICABILITY

According to one of the embodiments of the present disclosure, it is useful to prevent a user from losing interest in a video game.

What is claimed is:

1. A non-transitory computer-readable medium storing a video game processing program for causing a computer of a server to perform functions comprising controlling progress of a video game using a virtual space corresponding to map information of a real space and positional information of a user terminal of a user, the functions further comprising:

associating an object that appears in the video game and positional information of the virtual space one another in virtual space related information;

specifying a position of the user from the positional information of the user terminal;

specifying at least a part of the virtual space as a first target virtual space based on the virtual space related information and the position of the user;

causing the user terminal to display the first target virtual space;

associating the object and the user one another based on a position of the object and the position of the user;

registering the object and the user in a storage unit;

specifying a second target virtual space including the object or another object related to the object as the virtual space, if the object associated with the user is selected by the user;

causing the user terminal to display the second target virtual space;

displaying a selection screen to cause the user to select whether to execute an event corresponding to the object or register the object in the storage unit, if the user selects the object within either the first target virtual space or the second target virtual space;

generating an event corresponding to an object, if a selection to execute the event by the user is received; and giving a point to the user if the user satisfies a predetermined giving condition regarding the object in the virtual space, wherein generating the event corresponding to the object is performed in exchange for consumption of the point possessed by the user.

2. The non-transitory computer-readable medium according to claim 1, wherein specifying the second target virtual space including the object includes changing a position of the object selected by the user in the virtual space based on a current position of the user.

3. The non-transitory computer-readable medium according to claim 1, wherein specifying the second target virtual space includes specifying the second target virtual space including a sub object includes determining arrangement of the sub object based on a current position of the user, if the object selected by the user includes the at least one sub object.

4. The non-transitory computer-readable medium according to claim 1, wherein registering the object and the user includes registering the position of the user when the object and the user are registered in association in the storage unit as a registered position in the storage unit, and wherein specifying the second target virtual space includes changing a current position of the user into the registered position, if the registered position corresponding to the object selected by the user is registered.

5. The non-transitory computer-readable medium according to claim 1, the functions further comprising:

releasing registration of an object that satisfies a predetermined rearrangement condition among the objects registered.

6. The non-transitory computer-readable medium according to claim 1, wherein registering the object and the user includes increasing or decreasing a number of points of the user to register the object in accordance with a predetermined update rule regarding a number of times the object and the user are registered in the storage unit to associate the object and the user one another.

7. The non-transitory computer-readable medium according to claim 1, wherein registering the object and the user includes a managing a number of times each kind of projects of a plurality of kinds of objects is registered, and stopping new registration in the storage unit until a predetermined reset condition is satisfied with respect to a kind of object that has been registered by a predetermined upper limit number of times.

8. A video game processing system, comprising:

a communication network;

a user terminal of a user; and a server configured to control progress of a video game using a virtual space corresponding to map information of a real space and positional information of the user terminal, wherein the video game processing system is configured to:

associate an object that appears in the video game and positional information of the virtual space one another in virtual space related information;

specify a position of the user from the positional information of the user terminal;

specify at least a part of the virtual space as a first target virtual space based on the virtual space related information and the position of the user;

associate the object and the user one another based on a position of the object and the position of the user register the object and the user in a storage unit;

specify a second target virtual space including the object or another object related to the object as the virtual space, if the object associated with the user is selected by the user;

cause the user terminal to display the second target virtual space;
display a selection screen to cause the user to select whether to execute an event corresponding to the object or register the object in the storage unit, if the user selects the object within either the first target virtual space or the second target virtual space;
generate an event corresponding to an object if a selection to execute the event by the user is received; and
give a point to the user if the user satisfies a predetermined giving condition regarding the object in the virtual space, wherein
generating the event corresponding to the object is performed in exchange for consumption of the point possessed by the user.

9. A non-transitory computer-readable medium storing a video game processing program for causing a user terminal to perform functions comprising controlling progress of a video game using a virtual space corresponding to map information of a real space and positional information of a user terminal of a user, the functions further comprising:
associating an object that appears in the video game and positional information of the virtual space one another in virtual space related information;
specifying a position of the user from the positional information of the user terminal;
specifying at least a part of the virtual space as a first target virtual space on a basis of virtual space related information and a position of the user;
displaying the virtual space;
registering the object and the user in a storage unit so as to be associated with each other on a basis of a position of the object and the position of the user;
specifying a second target virtual space including the object or another object related to the object as the virtual space in a case where the object associated with the user is selected by the user, the second target virtual space;
displaying the second target virtual space;
displaying a selection screen to cause the user to select whether to execute an event corresponding to the object or register the object in the storage unit, if the user selects the object within either the first target virtual space or the second target virtual space;
generating an event corresponding to an object if a selection to execute the event by the user is received; and
giving a point to the user if the user satisfies a predetermined giving condition regarding the object in the virtual space, wherein
generating the event corresponding to the object is performed in exchange for consumption of the point possessed by the user.

* * * * *